(12) United States Patent
Chen

(10) Patent No.: US 12,353,015 B2
(45) Date of Patent: Jul. 8, 2025

(54) OPTICAL PACKAGE DEVICE AND METHOD OF MANUFACTURING THE SAME

(71) Applicant: Advanced Semiconductor Engineering, Inc., Kaohsiung (TW)

(72) Inventor: Ying-Chung Chen, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 160 days.

(21) Appl. No.: 18/105,705

(22) Filed: Feb. 3, 2023

(65) Prior Publication Data

US 2024/0264377 A1 Aug. 8, 2024

(51) Int. Cl.
G02B 6/293 (2006.01)
(52) U.S. Cl.
CPC ................. *G02B 6/29301* (2013.01)
(58) Field of Classification Search
CPC .................................................. G02B 6/29301
See application file for complete search history.

(56) References Cited

U.S. PATENT DOCUMENTS

2023/0239047 A1*  7/2023  Toyota ............... H01Q 3/26

FOREIGN PATENT DOCUMENTS

DE    102020207742 A1 * 12/2021

OTHER PUBLICATIONS

English translation of DE-102020207742-A1 (Year: 2021).*

* cited by examiner

*Primary Examiner* — Sung H Pak
(74) *Attorney, Agent, or Firm* — FOLEY & LARDNER LLP

(57) ABSTRACT

An optical package device and a method of manufacturing the same are disclosed. The optical package device includes an optical component and an optical guiding component. The optical component is configured to change a phase of an input optical signal from a first state to a second state, and to output a first beam with a phase of the second state. The optical guiding component is disposed adjacent to the optical component, the first beam propagating from the optical component toward the optical guiding component. The physical axis of the optical component perpendicular thereto is not parallel with a physical axis of the optical guiding component perpendicular thereto.

20 Claims, 24 Drawing Sheets

OPTICAL PACKAGE DEVICE AND METHOD OF MANUFACTURING THE SAME

BACKGROUND

1. Field of the Disclosure

The present disclosure relates to an optical package device and a method of manufacturing the same.

2. Description of the Related Art

The assembly of an optical module relies on several alignment steps. Any offset or misalignment occurring in the alignment steps would cause an unacceptable amount of error to accumulate.

SUMMARY

In some embodiments, an optical package device includes an optical component and an optical guiding component. The optical component is configured to change a phase of an input optical signal from a first state to a second state, and to output a first beam with a phase of the second state. The optical guiding component is disposed adjacent to the optical component, the first beam propagating from the optical component toward the optical guiding component. The physical axis of the optical component perpendicular thereto is not parallel with a physical axis of the optical guiding component perpendicular thereto.

In some embodiments, an optical package device includes a carrier, a lid, and an optical phase array. The lid is disposed over the carrier and has an opening. The carrier and the lid collectively define a cavity. The optical phase array is disposed in the cavity and configured to change a phase of an input optical signal from a first state to a second state, and to output a first beam with a phase of the second state. The first beam propagates through the opening of lid.

In some embodiments, a method of manufacturing an optical package device includes disposing an optical source over an optical component through a first alignment; attaching the optical component to a carrier; and attaching a lid to the carrier through a second alignment to surround the optical component.

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
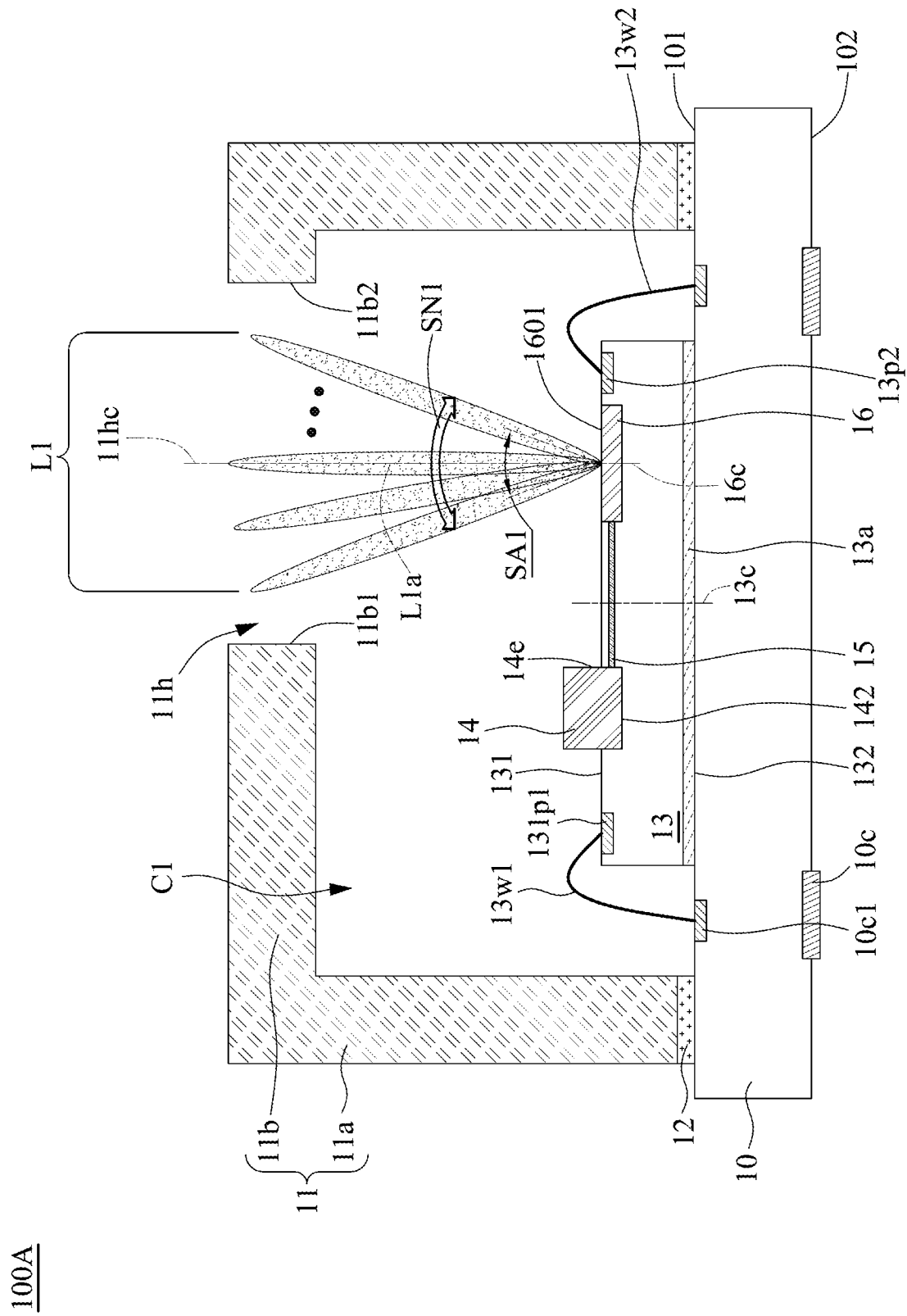
FIG. 1 is a cross-sectional view of an optical package device in accordance with some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a cross-sectional view of an optical package device 100A in accordance with some embodiments of the present disclosure. The optical package device 100A may include a carrier 10, a lid 11, an adhesive layer 12, and an optical component 13.

The carrier 10 may be disposed below the lid 11. The carrier 10 and the lid structure 11 may collectively define a cavity (or a chamber) C1 to accommodate the optical component 13. The carrier 10 may have an upper surface 101 and a lower surface 102 opposite to the upper surface 101. The carrier 10 may include a plurality of pads 10c at the lower surface 102. The pads 10c may be configured to connect with an external device, system, or carrier through a connection element (e.g., a solder bump).

In some embodiments, the carrier 10 may include a lead frame encapsulated by molding compounds. In some embodiments, the carrier 10 may include, for example, a printed circuit board (PCB), such as a paper-based copper foil laminate, a composite copper foil laminate, or a polymer-impregnated glass-fiber-based copper foil laminate. In some embodiments, the carrier 10 may include a semiconductor substrate including silicon, germanium, or other suitable materials. In some embodiments, the carrier 10 may include a redistribution layer (RDL) (not shown) including a plurality of conductive traces and/or a plurality of conductive vias.

The lid 11 may be disposed over the carrier 10. The lid may include a portion 11a extending substantially perpendicular to the upper surface 101 of the carrier 10 and a portion 11b extending substantially perpendicular to the portion 11a. The portion 11a may connect with the portion 11b. The adhesive layer 12 may connect the portion 11b of the lid 11 and the carrier 10 (e.g., the upper surface 101 of the carrier 10). The adhesive layer 12 may include silicone, wax, polymer, metal, or other suitable materials. The lid 11 may have an opening (or a window or hole) 11h. The opening 11h may be defined by opposite sides 11b1 and 11b2 of the portion 11b. The cavity C1 may connect with the opening 11h. The opening 11h may be located over the cavity C1. The opening 11h may be located over the optical component 13. A portion of the optical component 13 may be exposed by the opening 11h.

The optical component (or a photonic component) 13 may be disposed over the carrier 10 (or the upper surface 101 of the carrier 10). The optical component 13 may be disposed below the lid 11. The optical component 13 may be surrounded by the lid 11. The optical component 13 may be disposed within the cavity C1. The optical component 13 may have an upper surface 131 facing the lid 11 and a lower surface 132 facing the carrier 10. The upper surface 131 is opposite to the lower surface 132. The lower surface 132 of the optical component 13 may be in contact with the upper surface 101 of the carrier through an adhesive layer 13a. The optical component 13 may include a photonic integrated circuit. The optical component 13 may be configured to transmit or receive one or more optical signals. The optical component 13 may be configured to transmit or receive one or more electrical signals. The optical component 13 may be configured to convert optical signals to electrical signals and vice versa.

The optical component 13 may include pads 13p1 and 13p2 at the upper surface 131 of the optical component 13. The pads 13p1 and 13p2 may be electrically connected to a circuit structure (not shown) in the optical component 13. The optical package device 100 may include a plurality of wires 13w1 and 13w2 respectively connecting the pads 13p1 and 13p2 of the optical component 13 to the carrier 10 (e.g., a plurality of pads 10cl at the upper surface 101 of the carrier 10). The wires 13w1 and the 13w2 may be disposed at opposite sides of the optical component 13. The wires 13w1 and/or wires 13w2 may electrically connect the optical component 13 to the carrier 10.

Figure 1A:
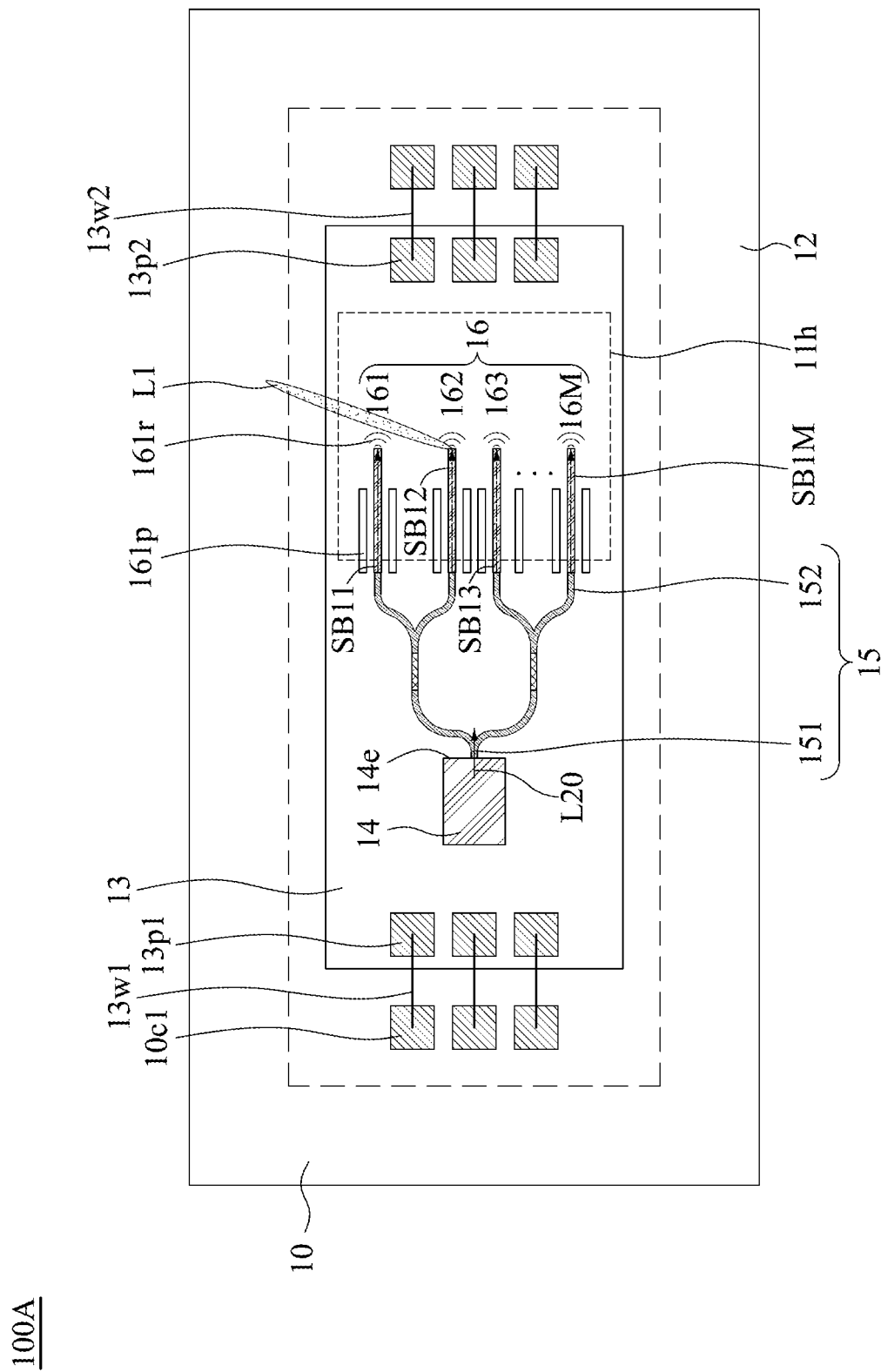
FIG. 1A is a perspective view of an optical package device in accordance with some embodiments of the present disclosure.

FIG. 1A is a perspective view of an optical package device (e.g., the optical package device 100A) in accordance with some embodiments of the present disclosure.

Referring to FIGS. 1 and 1A, the optical component 13 may include an optical source 14, a waveguide (or a channel) 15, and an optical phase array (or a phase change element) 16. The optical source 14 may be optically coupled to the waveguide 15. The optical phase array 16 may be optically coupled to the waveguide 15. In some embodiments, the optical package device 100A may include the optical source 14, the waveguide 15, and the optical phase array 16.

The optical source 14 may be disposed at the upper surface 131 of the optical component 13. The optical source 14 may be disposed over the optical component 13. The optical source 14 may be partially embedded in the optical component 13. The optical source 14 may include a portion embedded in the optical component 13. The optical source 14 may have a surface 142 between the surface 131 and the surface 132 of the optical component 13. The optical source 14 may have an end 14e optically coupled to the waveguide 15. The optical source may be configured to generate an input optical signal (or an optical signal) L20 as illustrated in FIG. 1A. The optical source 14 may be configured to generate the input optical signal L20 based on the electrical signals transmitted from the circuit structure of the optical component 13 or the wires 13w1 and 13w2.

The optical source 14 may include a coherent optical source. The optical source 14 may be configured to emit coherent light. The optical source 14 may include, for example, a laser. The optical source 14 may include, for example, an edge-emitting layer configured to couple the waveguide 15 at the end 14e of the optical source 14. In some embodiments, the optical source 14 may include, for example, a vertical cavity surface emitting layer (VCSEL), such that the optical source 14 may emit the input optical signal L20 at the lower surface 142. The input optical signal L20 may be generated by the coherent optical source 140 with a fixed wavelength that operably communicates with the waveguide 15.

As shown in FIG. 1, the waveguide 15 may be disposed between the optical source 14 and the optical phase array 16. As shown in FIG. 1A, the waveguide 15 may be configured to transmit the input output signal L20. The waveguide 15 may include a portion (or a first portion) 151 optically coupled to the optical source 14 and a portion 152 (or a second portion) 152 optically coupled with the optical phase array 16. The portion 151 may be connected to the portion 152. The portion 151 may include a Y-branch waveguide that splits the input optical signal L20 into a plurality of sub-beams. The portion 152 may include a plurality of Y-branch waveguides that receive the sub-beams from the portion 151 and split them into a plurality of sub-beams SB11, SB12, SB13, ..., SB1M, wherein M can be an integer. The waveguide 15 as illustrated in FIG. 1A is an example only. The waveguide 15 may include more portions than portions 151 and 152. The waveguide 15 may include other types of splitters; for example, a directional splitter, a multimode interference splitter, or the like. In some embodiments, the waveguide 15 may be configured to transmit the sub-beams SB11, SB12, SB13, ..., SB1M. The waveguide 15 may be made of dielectric material or any other optically conductive materials.

As shown in FIG. 1, the optical phase array 16 may be disposed within the optical component 13. The optical phase array 16 may be disposed at the upper surface 131 of the optical component 13. In some embodiments, the optical phase array 16 may be disposed on the optical component 13. The optical phase array 16 may be exposed by the opening 11h of the lid 11. As shown in FIG. 1A, the optical phase array 16 may include a plurality of unit cells 161, 162, 163, ..., 16M. The unit cells 161, 162, 163, ..., 16M may be optically coupled to portion 152 of the waveguide 15. Each of the unit cells 161, 162, 163, ..., 16M may be configured to respectively receive the sub-beams SB11, SB12, SB13, ..., SB1M. Each of the unit cells may allow a sub-beam to propagate therethrough. The optical phase array 16 as illustrated in FIG. 1A is an example only. The optical phase array 16 may include 64*64 unit cells in an array or another configuration.

Each of the unit cells 161, 162, 163, ..., 16M may include a phase shifter 161p and a radiator (or an antenna element, or a grating portion) 161r. Each of the phase shifters 161p may be configured to alter (or adjust, control) the phase of the corresponding sub-beam (one of the sub-beams SB11, SB12, SB13, ..., SB1M) of the input output signal L20. In some embodiments, the phase shifters 161p may be configured to induce a thermo-optic phase shift on the phase of the sub-beams SB11, SB12, SB13, ..., SB1M. The phase shifters 161p may be thermo-optic phase shifters. The phase shifters 161p may be configured to induce an electro-optic phase shift on the phase of the sub-beams SB11, SB12, SB13, ..., SB1M. The phase shifters 161p may be electro-optic phase shifters. In some embodiments, the phase shifters 161p may adjust the refractive indexes of the unit cells (e.g., waveguides).

The radiators 161r may be configured to the sub-beams SB11, SB12, SB13, ..., SB1M from the input output signal L20. In some embodiments, the radiators 161r may be configured to output a plurality of wavefronts based on the sub-beams SB11, SB12, SB13, ..., SB1M. The wavefronts may interfere with each other through multiple slit diffraction. In some embodiments, the sub-beams SB11, SB12, SB13, ..., SB1M generated by the optical phase array 16 may form a beam (or a first beam) L1 through multiple slit diffraction. By adjusting or controlling the phase of the sub-beams SB11, SB12, SB13, ..., SB1M of the input output signal L20, the direction or intensity of the beam L1 can be adjusted or controlled. In other words, by dynamically controlling the optical properties of the sub-beams SB11, SB12, SB13, ..., SB1M of the input output signal L20, the optical phase array 16 (or the optical component 13) may be configured to steer the direction of the beam L1. In some embodiments, the optical phase array 16 may be configured to alter a wavefront of the input optical signal L20. The beam L1 may be deflected from a propagation direction of the input optical signal L20.

The optical component 13 may be configured to change a phase of the input optical signal L20 from a first state to a second state and to output the beam L1 with a phase of the second state. In particular, the optical phase array 16 may be configured to change the phase of the input optical signal L20 from the first state to the second state by the phase shifters 161p and output the beam L1 with the phase of the second state in response to the input optical signal L20 through multiple slit diffraction.

Figure 1C:
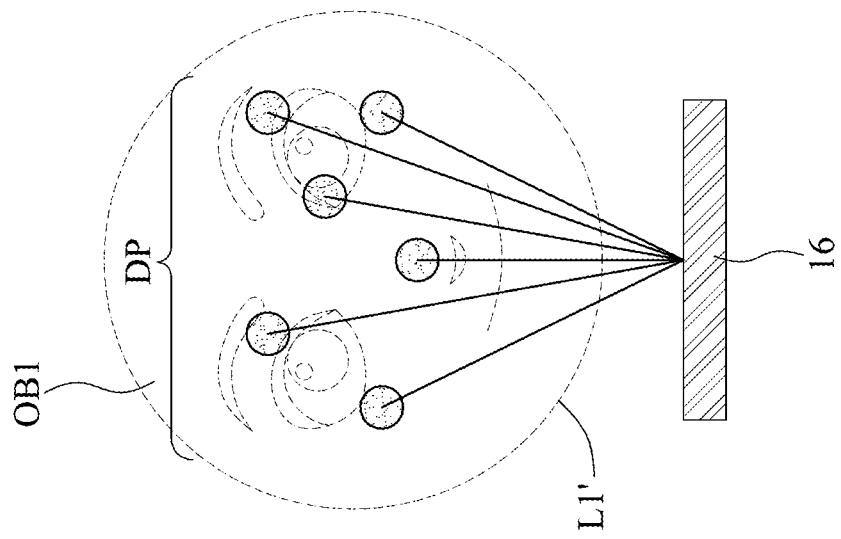
FIG. 1C is a schematic diagram of the operation of an optical phase array in accordance with some embodiments of the present disclosure.
Figure 1B:
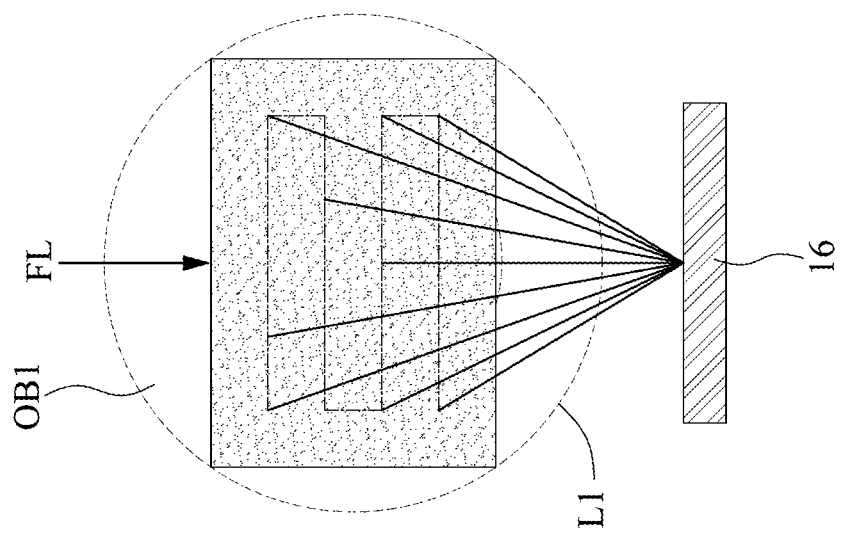
FIG. 1B is a schematic diagram of the operation of an optical phase array in accordance with some embodiments of the present disclosure.

Referring again to FIG. 1, the optical phase array 16 may steer the beam L1 by controlling the phase of the sub-beams SB11, SB12, SB13, ..., SB1M of the input optical signal L20. The optical phase array 16 may be configured to consecutively adjust the direction of the beam L1. The beam L1 may be emitted by the optical phase array 16 in different directions at respective time intervals. The optical phase array 16 may be configured to output the beam L1 in a scanning manner. The beam L1 may propagate through the opening 11h. In other words, the optical phase array 16 may be configured to scan an external object through the beam L1. As shown in FIG. 1, the beam L1 may have a scanning movement SN1 to define a scanning angle SA1. The scanning angle SA1 may be around 100, 120, or 140 degree. The scanning angle SA1 may be controlled by the optical phase array 16, such that the beam L1 in different directions may pass through the opening 11h but not reach the sides 11b1 and 11b2 of the portion 11b of the lid 11. FIGS. 1B and 1C may illustrate one or more operations of the optical phase array 16.

FIG. 1B is a schematic diagram of the operation of an optical phase array (e.g., the optical phase array 16) in accordance with some embodiments of the present disclosure. FIG. 1C is a schematic diagram of the operation of an optical phase array (e.g., the optical phase array 16) in accordance with some embodiments of the present disclosure.

Referring to FIG. 1B, the beam L1 may project a pattern FL on the object OB1 outside or adjacent to the optical package device 100A via the beam L1. The pattern FL may include a flood light or be analogous to flood light. The optical phase array 16 may be configured to scan an object OB1 via the beam L1. The beam L1 may continuously change its direction by controlling the optical phase array 16, and may arrive at different portions of the object OB1. The speed of the change of the direction of the beam L1 may be higher than a detection refresh speed. The cone size of the beam L1 over the object OB1 may be less than 1 degree.

Referring to FIG. 1C, the beam L1 may project a pattern DP on the object OB1 outside or adjacent to the optical package device 100A via a beam L1'. The pattern DP may include a plurality of dots (or a dot array) over the object OB1 or be analogous to a dot array. The dots of the pattern DP may be separated from each other. The beam L1' may have optical properties similar to the beam L1, except that the extent of the change of the direction of the beam L1' may be greater than that of the beam L1, or the cone sizes of the beams L1 and L1' may be different.

In some embodiments, the optical source 14 may include a plurality of optical sources respectively generate input optical signals for projecting the pattern FL and the pattern DP, respectively.

Referring again to FIG. 1, a physical axis 13c of the optical component 13 perpendicular thereto may be misaligned with a physical axis 11hc of the opening 11h. A physical axis 16c of the optical phase array 16 perpendicular thereto may be substantially aligned with the physical axis 11hc of the opening 11h. The optical phase array may be disposed offset from the physical axis 13c of the optical component 13. An optical axis L1a of the beam L1 may be substantially parallel to the physical axis 11hc of the opening 11h. The optical axis L1a of the beam L1 may be substantially aligned with the physical axis 11hc of the opening 11h. Therefore, the beam L1 can propagate through the opening 11h without striking the portion 11b of the lid 11.

In some comparative embodiments, an optical package device may include a stack of lenses and optical components to project a particular pattern (e.g., the flood light, or the dot array), and the sizes (e.g., the Z-height) of said lenses and components may not allow them to fit onto the optical package device given the trend of ever-shrinking parts in semiconductor manufacturing. Furthermore, a significant number of the alignment steps is required for the numerous optical components and a package body (e.g., a lid). The offset or misalignment occurring in the alignment steps would cause an unacceptable amount of error to accumulate. In the present disclosure, the optical phase array 16 disposed within the lid 11 may be configured to output the beam L1 in the scanning manner to project the patterns FL and/or DP on the object OB1 without the existence of numerous lenses or optical guiding elements. As such, the size (e.g., Z-height) of the optical package device 100A can be reduced. During the manufacture of the optical package device 100A, the alignment steps may be significantly reduced, e.g., to only 2 alignment steps, which will be discussed in FIGS. 3A-3D. The offset or misalignment can be significantly reduced.

Figure 1D:
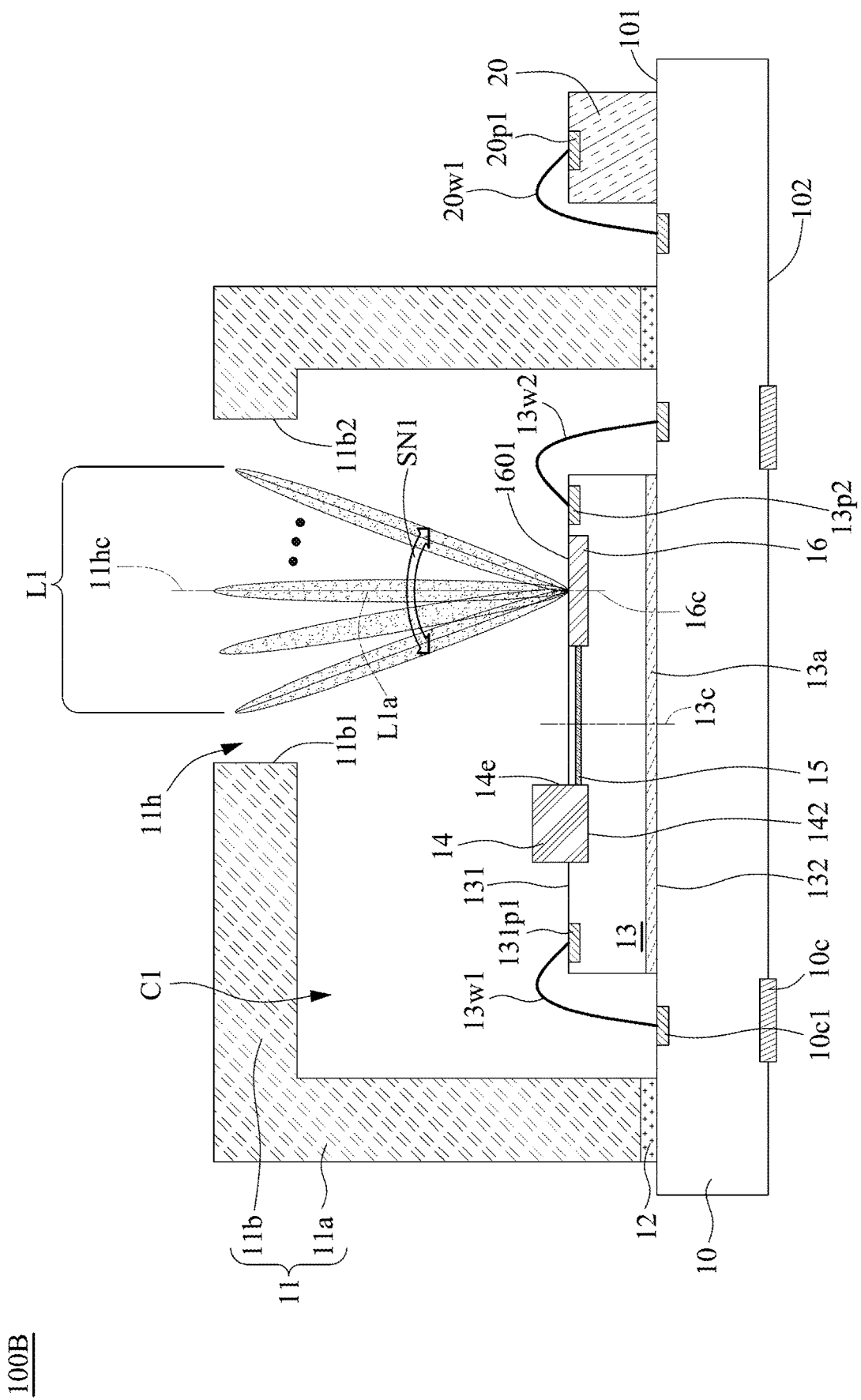
FIG. 1D is a cross-sectional view of an optical package device in accordance with some embodiments of the present disclosure.

FIG. 1D is a cross-sectional view of an optical package device (e.g., an optical package device 100B) in accordance with some embodiments of the present disclosure. Some detailed descriptions may correspond to preceding paragraphs related to FIGS. 1 and 1A and are not repeated hereinafter for conciseness, with differences therebetween as follows.

The optical package device 100B may include an electronic component 20 disposed adjacent to the optical component 13. The electronic component 20 may be disposed outside the cavity C1. The electronic component 20 may include a pad 20p1 at an upper surface of the electronic component 20. The pad 20p1 may be electrically connected to a circuit structure (not shown) in the electronic component 20. The optical package device 100 may include a wire 20w1 connecting the pad 20p1 of the electronic component 20 to the carrier 10 (e.g., the pad 10cl at the upper surface 101 of the carrier 10). The wire 20w1 may electrically connect the electronic component 20 to the carrier 10. The electronic component 20 may be electrically connected to the optical component 13 through the carrier 10. The electronic component 20 may be configured to control the optical source 14 and the optical phase array 16 of the optical component 13.

In an alternative embodiments, the optical component 13 may include the electronic component 20 of FIG. 1D. The electronic component 20 may be disposed over the surface 131 of the optical component 13 and adjacent to the optical source 14.

Figure 1E:
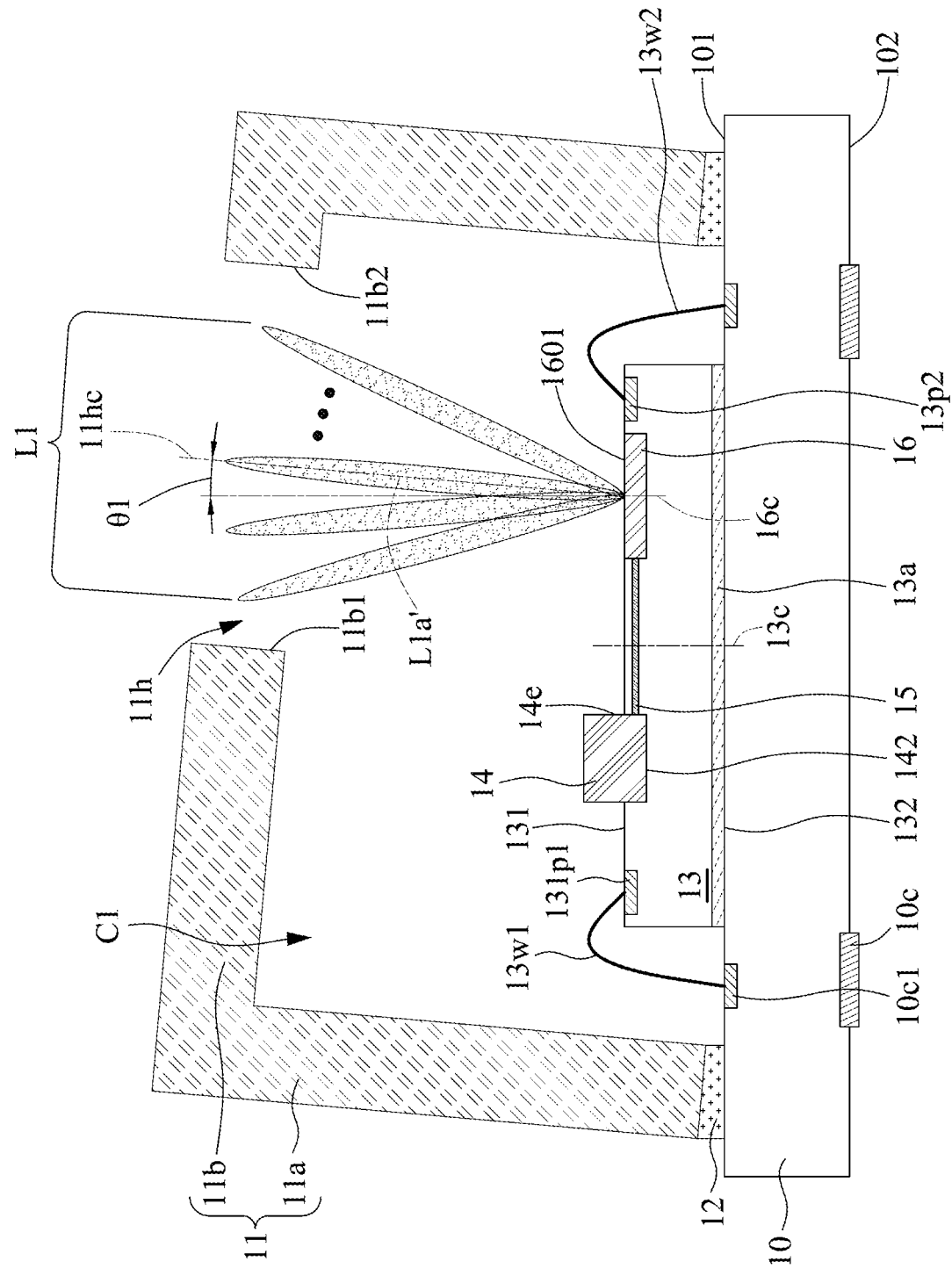
FIG. 1E is a cross-sectional view of an optical package device in accordance with some embodiments of the present disclosure.

FIG. 1E is a cross-sectional view of an optical package device (e.g., an optical package device 100C) in accordance with some embodiments of the present disclosure. Some detailed descriptions may correspond to preceding paragraphs related to FIGS. 1 and 1A and are not repeated hereinafter for conciseness, with differences therebetween as follows.

The lid 11 may be angled in relation to the carrier 10. The portion 11a of lid 11 may be angled in relation to the upper surface 101 of the carrier 10. During the attachment process of the lid 11 to the carrier 10, the lid 11 may be tilted and placed on the upper surface 101 of the carrier 10. As such, the physical axis 16c of the optical phase array 16 perpendicular thereto and the physical axis 11hc of the opening 11h may form an angle θ1. The angle θ1 may be around 0.5, 1, 2, 3 degrees or more. Therefore, the optical phase array 16 may not directly align with the opening 11h. In other words, the physical axis 16c of the optical phase array 16 is misaligned with the physical axis 11hc of the opening 11h.

Advantageously, the optical package device 100C is able to actively adjust the direction of the beam L1. By altering (or adjusting, controlling) the phase of the sub-beams SB11, SB12, SB13, . . . , SB1M of the input output signal L20, the multiple slit diffraction occurs between the wavefronts of the sub-beams SB11, SB12, SB13, . . . , SB1M may output the beam L1 with a tilted optical axis L1a', with respect to the optical phase array 16. The optical axis L1a' of the beam and the physical axis 16c of the optical phase array 16 may form the angle θ1. The optical axis L1a' of the beam L1 may be substantially parallel to the physical axis 11hc of the opening. As such, the beam L1 can propagate through the opening 11h without striking the portion 11b of the lid 11. That is, an offset (including shift or tilt) between the opening 11h and the optical phase array 16 that occurs during the attachment process can be compensated by actively steering the beam L1 to a desired direction.

Figure 2:
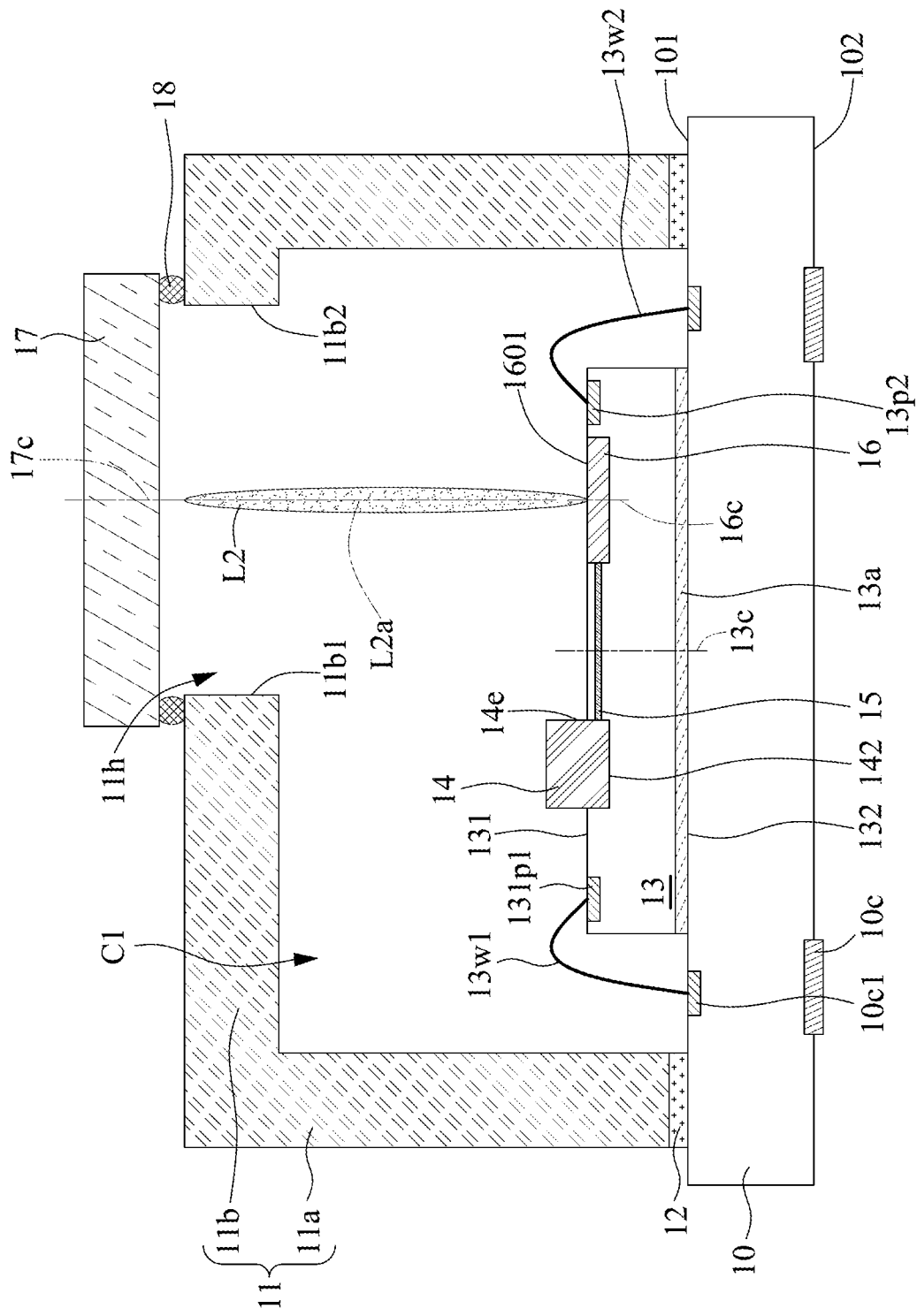
FIG. 2 is a cross-sectional view of an optical package device in accordance with some embodiments of the present disclosure.

FIG. 2 is a cross-sectional view of an optical package device (e.g., an optical package device 200) in accordance with some embodiments of the present disclosure. Some detailed descriptions may correspond to preceding paragraphs related to FIGS. 1 and 1A and are not repeated hereinafter for conciseness, with differences therebetween as follows.

The optical package device 200 may further include an optical guiding component 17 disposed over the portion 11b of the lid 11. The optical guiding component 17 may be attached to the portion 11b of the lid 11 via a connection element 18. The optical guiding component 17 may cover the opening 11h. In some embodiments, a physical axis 17c may be aligned with the physical axis 11hc of the opening 11h. The optical guiding component 17 may be disposed adjacent to the optical component 13. The optical guiding component 17 may be aligned with the optical phase array 16. In some embodiments, the physical axis 17c may be aligned with the physical axis 16c of the optical phase array 16. In some embodiments, the optical guiding component 17 may vertically overlap the grating portion 161r of the optical phase array 16.

The optical phase array 16 may be configured to output a beam (or a second beam) L2. The beam L2 may propagate from the optical phase array 16 to the optical guiding component 17. The beam L2 may have a cone angle less than 1 degree. The optical phase array 16 may be configured to steer the beam L2 by controlling the phase of the sub-beams SB11, SB12, SB13, . . . , SB1M of the input optical signal L20. The optical phase array 16 may be configured to output the beam L2 in a scanning manner (similar to the beam L1 of FIG. 1) and allow the beam L2 to pass through the optical guiding component 17. The optical guiding component 17 may be configured to diffract the beam L2. The diffracted beam L2 from the optical guiding component 17 may project a pattern (e.g., the flood light FL or the dot array DP as shown in FIGS. 1B and 1C) on an external object.

In the present disclosure, the optical phase array 16 and the optical guiding component 17 may be configured to collectively output the diffracted beam L2 to project a pattern on an external object without the existence of a stack of lenses and optical components. As such, the size (e.g., Z-height) of the optical package device 200 can be reduced. During the manufacture of the optical package device 200, the alignment steps may be significantly reduced, e.g., to only 3 alignment steps, which will be discussed in FIGS. 3A-3F. The offset or misalignment can be significantly reduced.

The optical guiding component 17 may be electrically isolated. In some embodiments, the optical guiding component 17 may include a MEMS structure, a micro-lens array (MLA), or a diffraction optical element (DOE).

Figure 2A:
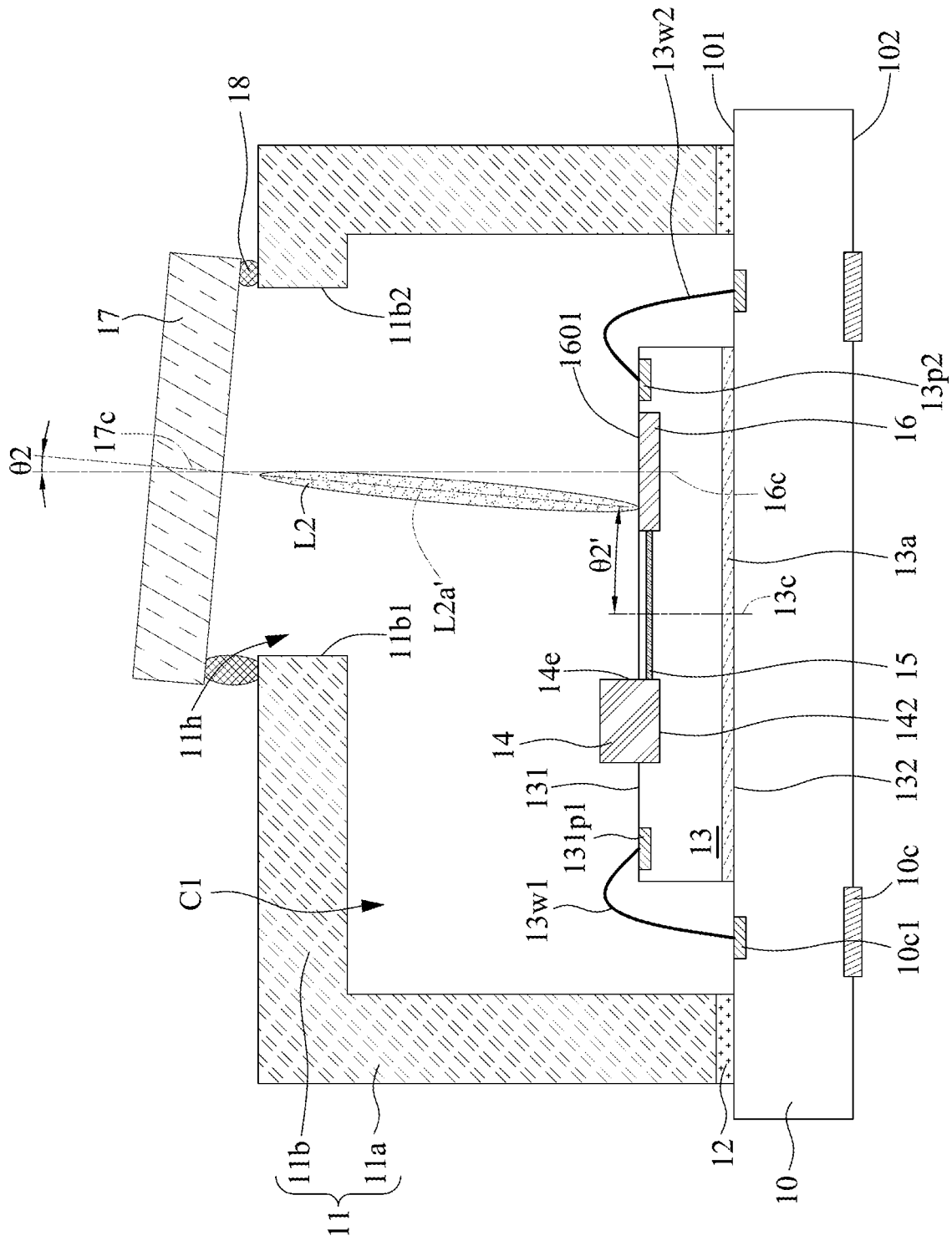
FIG. 2A is a cross-sectional view of an optical package device in accordance with some embodiments of the present disclosure.

FIG. 2A is a cross-sectional view of an optical package device (e.g., an optical package device 200A) in accordance with some embodiments of the present disclosure. Some detailed descriptions may correspond to preceding paragraphs related to FIG. 2 and are not repeated hereinafter for conciseness, with differences therebetween as follows.

The optical guiding component 17 may be angled in relation to the lid 11. The optical guiding component 17 may be angled in relation to the portion 11b of lid 11. During the attachment process of the optical guiding component 17 to the lid 11, the lid 11 may be tilted and placed on the portion 11b of lid 11. As such, the physical axis 16c of the optical phase array 16 perpendicular thereto is not parallel with a physical axis 17c of the optical guiding component 17 perpendicular thereto. In some embodiments, the physical axis 13c of the optical component 13 perpendicular thereto is not parallel with a physical axis 17c of the optical guiding component 17 perpendicular thereto. The physical axis 16c of the optical phase array 16 perpendicular thereto and the physical axis 17c of the optical guiding component 17 may form an angle θ2. The angle θ2 may be around 0.5, 1, 2, 3 degrees or more. Therefore, the optical phase array 16 may not directly align with the optical guiding component 17. In other words, the physical axis 16c of the optical phase array 16 is misaligned with the physical axis 17c of the optical guiding component 17.

Advantageously, the optical package device 200A is able to actively adjust the direction of the beam L2. By altering (or adjusting, controlling) the phase of the sub-beams SB11, SB12, SB13, . . . , SB1M of the input output signal L20, the multiple slit diffraction occurs between the wavefronts of the sub-beams SB11, SB12, SB13, . . . , SB1M may output the beam L2 with a tilted optical axis L2a', with respect to the optical phase array 16. The optical axis L2a' of the beam L2 and the physical axis 16c of the optical phase array 16 (or the physical axis 13c of the optical component 13) may form an angle θ2. The optical axis L2a' of the beam L2 may be substantially parallel to the physical axis 17c of the optical guiding component 17. As such, the beam L2 can propagate toward the optical guiding component 17 and be incident on the optical guiding component 17 at a desired angle (e.g., normal angle). That is, an offset (including shift or tilt) between the optical guiding component 17 and the optical phase array 16 that occurs during the attachment process can be compensated by actively steering the beam L2 to a desired direction.

In some embodiments, the optical component 13 may include the electronic component 20 of FIG. 1D. In some embodiments, the electronic component 20 may be disposed over the surface 131 of the optical component 13 and adjacent to the optical source 14. The electronic component 20 may include a processing unit configured to calculate an optimal incident area on the optical guiding component 17 for the beam L2 to pass through. The optimal incident area may be defined as available optical power output behind component 17. The electronic component in the optical component 13 may include a storage unit configured to store the optimal incident area. In some embodiments, the optical component 13 may include an electronic component or an integrated circuit (not shown) configured to perform a function which is the same as or similar to that of the electronic component 20.

Figure 2B:
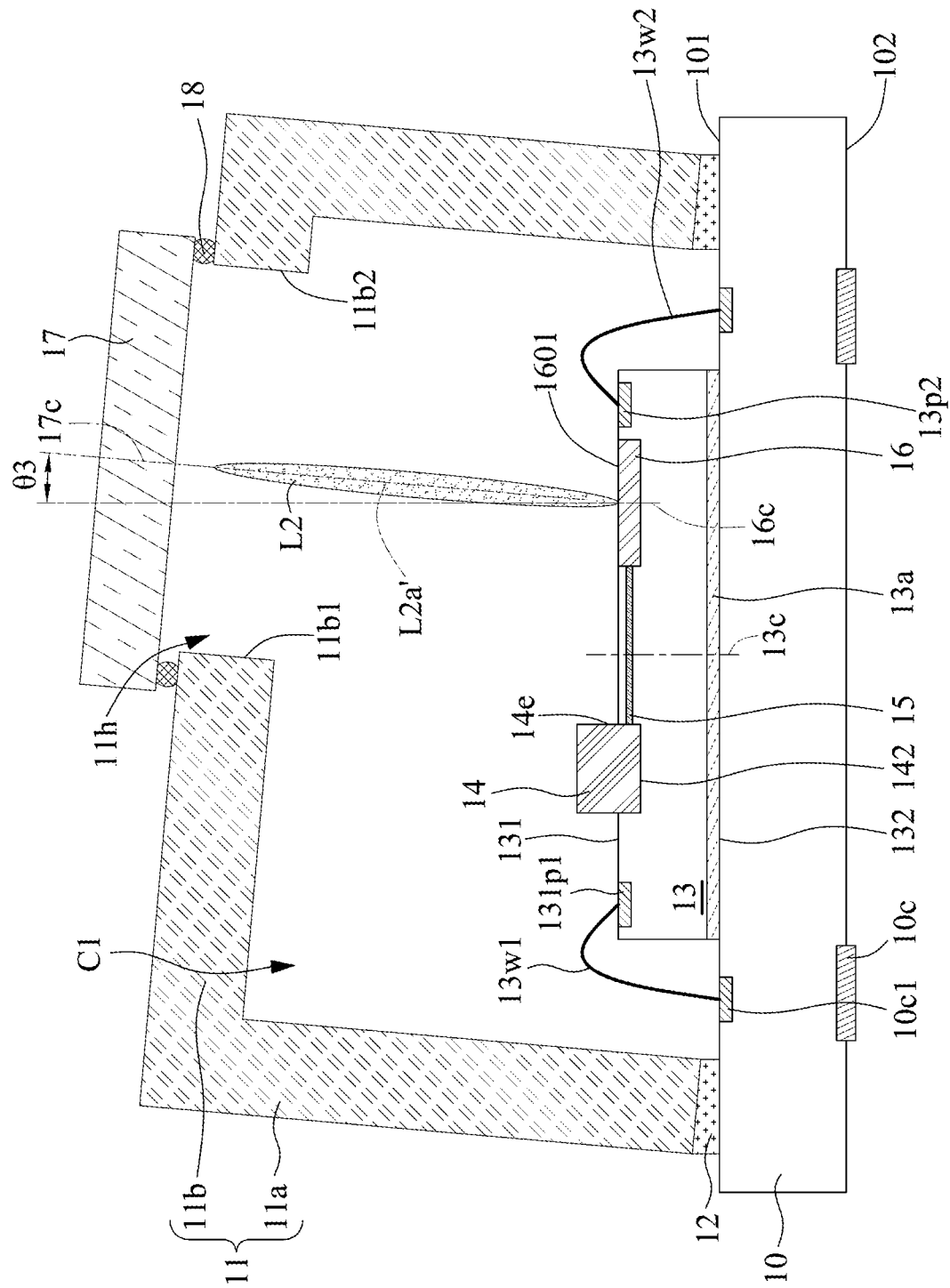
FIG. 2B is a cross-sectional view of an optical package device in accordance with some embodiments of the present disclosure.

FIG. 2B is a cross-sectional view of an optical package device (e.g., an optical package device 200B) in accordance with some embodiments of the present disclosure. Some detailed descriptions may correspond to preceding paragraphs related to FIG. 2 and are not repeated hereinafter for conciseness, with differences therebetween as follows.

The lid 11 may be angled in relation to the carrier 10. The portion 11a of lid 11 may be angled in relation to the upper surface 101 of the carrier 10. During the attachment process of the lid 11 to the carrier 10, the lid 11 may be tilted and placed on the upper surface 101 of the carrier 10. As such, the physical axis 16c of the optical phase array 16 perpendicular thereto and the physical axis 17c of the optical guiding component 17 may form an angle θ3. The angle θ3 may be around 0.5, 1, 2, 3 degrees or more. Therefore, the optical phase array 16 may not directly align with the optical guiding component 17. In other words, the physical axis 16c of the optical phase array 16 is misaligned with the physical axis 17c of the optical guiding component 17.

Advantageously, the optical package device 200B is able to actively adjust the direction of the beam L2. By altering (or adjusting, controlling) the phase of the sub-beams SB11, SB12, SB13, . . . , SB1M of the input output signal L20, the multiple slit diffraction occurs between the wavefronts of the sub-beams SB11, SB12, SB13, . . . , SB1M may output the beam L2 with a tilted optical axis L2a', with respect to the optical phase array 16. The optical axis L2a' of the beam L2 and the physical axis 16c of the optical phase array 16 may form the angle θ3. The optical axis L2a' of the beam L2 may be substantially parallel to the physical axis 17c of the optical guiding component 17. As such, the beam L2 can propagate toward the optical guiding component 17 and be incident on the optical guiding component 17 at a desired angle (e.g., normal angle). That is, an offset (including shift or tilt) between the optical guiding component 17 and the optical phase array 16 that occurs during the attachment process can be compensated by actively steering the beam L2 to a desired direction.

Figure 2C:
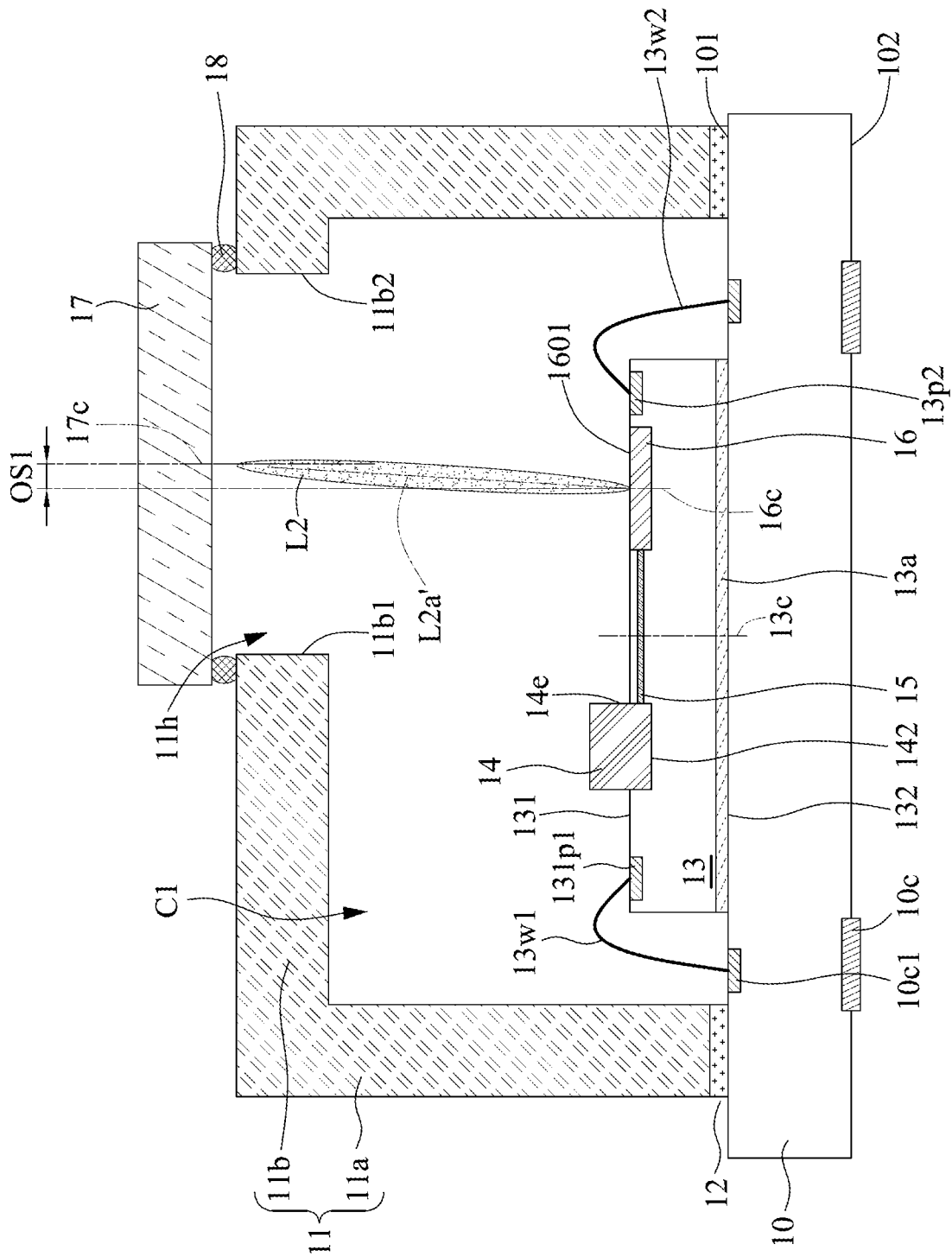
FIG. 2C is a cross-sectional view of an optical package device in accordance with some embodiments of the present disclosure.

FIG. 2C is a cross-sectional view of an optical package device (e.g., an optical package device 200C) in accordance with some embodiments of the present disclosure. Some detailed descriptions may correspond to preceding paragraphs related to FIG. 2 and are not repeated hereinafter for conciseness, with differences therebetween as follows.

The attachment of the lid 11 to the carrier 10 may have an offset or error. Owing to the offset or error, the physical axis 17c of the optical guiding component 17 is shifted from the physical axis 16c of the optical phase array 16 with an offset OS1. The offset OS1 may be around 50, 100, 150, 200, 250 µm. The physical axis 17c of the optical guiding component 17 may be misaligned with the physical axis 16c of the optical phase array 16.

Advantageously, the optical package device 200C is able to actively adjust the direction of the beam L2. By altering (or adjusting, controlling) the phase of the sub-beams SB11, SB12, SB13, . . . , SB1M of the input output signal L20, the multiple slit diffraction occurs between the wavefronts of the sub-beams SB11, SB12, SB13, . . . , SB1M may output the beam L2 with a tilted optical axis L2a', with respect to the optical phase array 16. The beam L2 can propagate toward the optical guiding component 17 and be incident on the optical guiding component 17 at a desired angle (e.g., normal angle). That is, an offset (including shift or tilt) between the optical guiding component 17 and the optical phase array 16 that occurs during the attachment process can be compensated by actively steering the beam L2 to a desired direction.

FIGS. 3A, 3B, 3C, and 3D show one or more stages of an exemplary method for manufacturing an optical package device (e.g., the optical package device 100A, 100B, or 100C) according to some embodiments of the present disclosure. FIGS. 3A, 3B, 3C, 3D, 3E, and 3F show one or more stages of an exemplary method for manufacturing an optical package device (e.g., the optical package device 200, 200A, 200B, or 200C) according to some embodiments of the present disclosure.

Figure 3A:
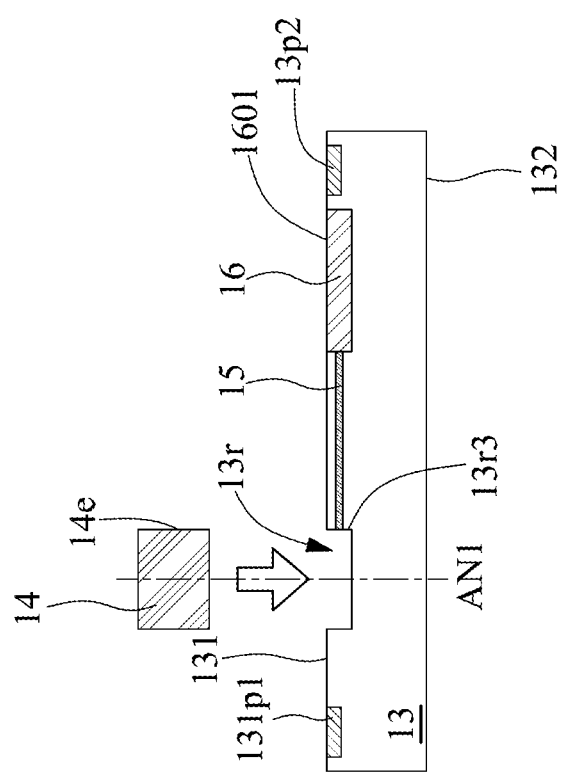
FIG. 3A shows one or more stages of an exemplary method for manufacturing an optical package device according to some embodiments of the present disclosure.

As shown in FIG. 3A, an optical component 13 may be provided. The optical component 13 may include a plurality of pads 13p1 and 13p2, a waveguide 15, and an optical phase array 16. The optical component 13 may have a lower surface (or a surface) 132 and an upper surface (or a surface) 131 opposite to the lower surface 132. The plurality of pads 13p1 and 13p2 may be disposed at the upper surface 131. The waveguide 15 may be disposed adjacent to the upper surface 131. The optical phase array may have a surface 1601 coplanar with the upper surface 131. The optical component 13 may have a recess 13r at the upper surface 131. The recess 13r may have a lateral surface 13r3. An optical source 14 may be disposed over the optical component 13 through a first alignment AN1. The first alignment AN1 may have a passive alignment.

Figure 3B:
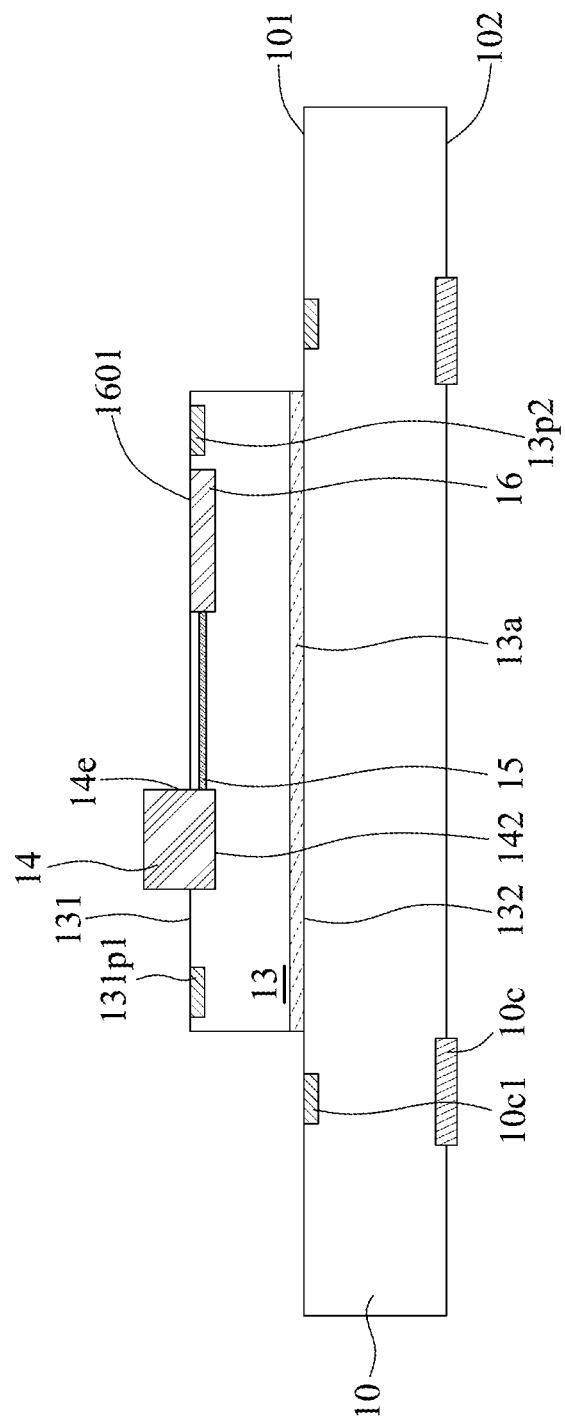
FIG. 3B shows one or more stages of an exemplary method for manufacturing an optical package device according to some embodiments of the present disclosure.

As shown in FIG. 3B, the optical source 14 may be disposed into the recess 13r. The optical source 14 may be partially embedded in the optical component 13. The optical source 14 may have an end 14e in contact with the lateral surface 13r3 of the recess 13r. The waveguide 15 may be optically coupled to the optical source 14 and the optical phase array 16.

The optical component 13 may be attached to a carrier 10 via an adhesive layer 13a. The carrier 10 may have an upper surface 101 and a lower surface 102 opposite to the upper surface 101. The carrier 10 may include a plurality of pads 10c at the lower surface 102 and a plurality of pads 10cl at the upper surface 101.

Figure 3C:
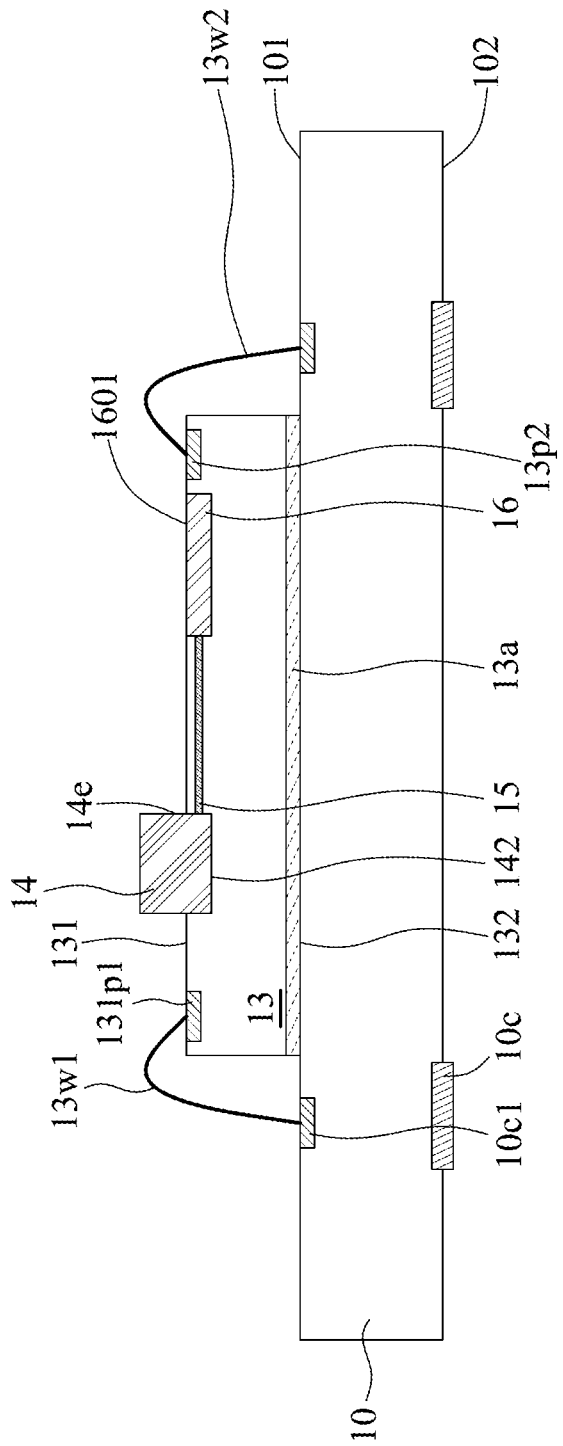
FIG. 3C shows one or more stages of an exemplary method for manufacturing an optical package device according to some embodiments of the present disclosure.

As shown in FIG. 3C, a plurality of wires 13w1 and 13w2 are formed to electrically connect the optical component 13 and the carrier 10 prior to attaching a lid 11 to the carrier 10.

Figure 3D:
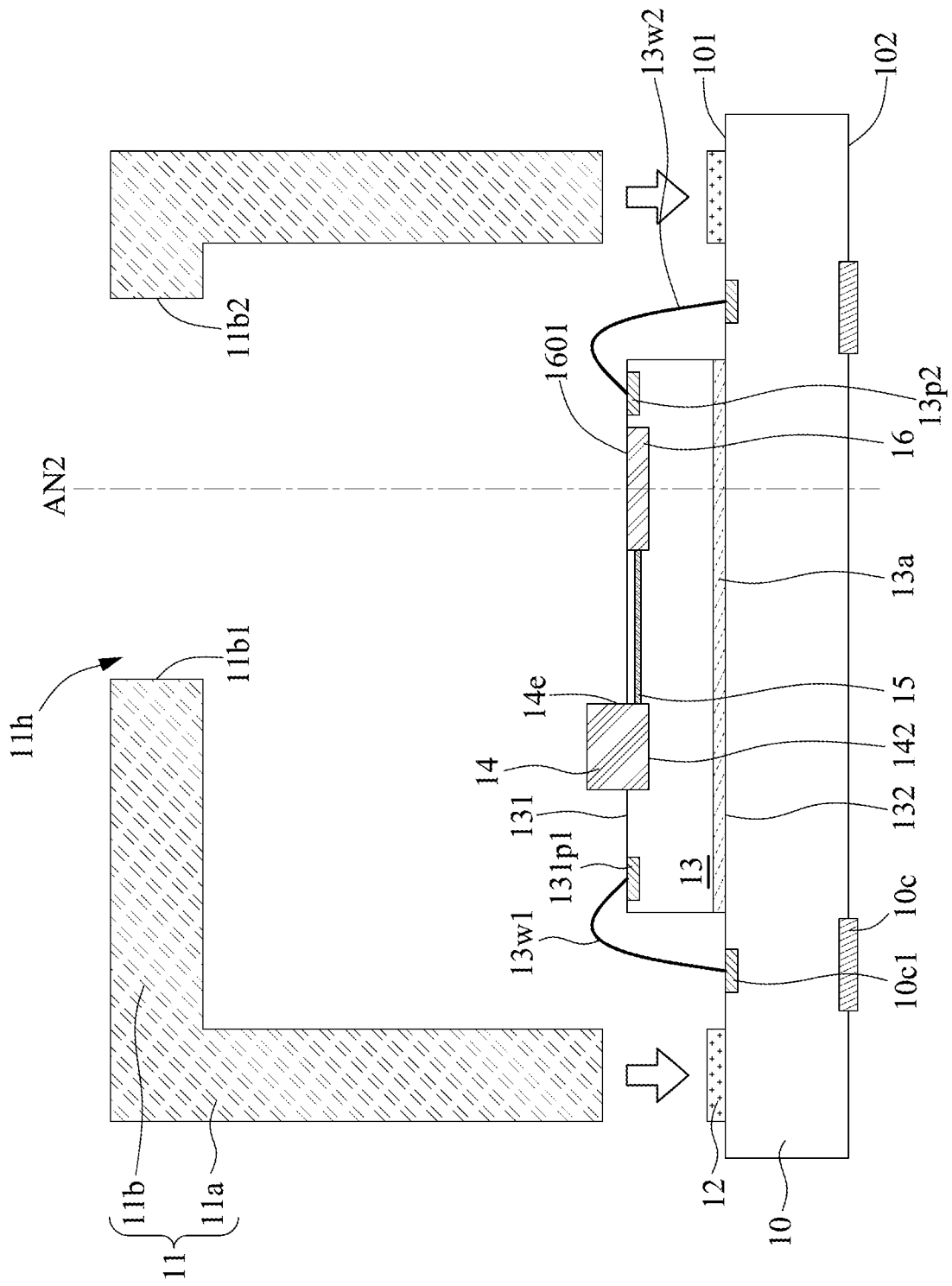
FIG. 3D shows one or more stages of an exemplary method for manufacturing an optical package device according to some embodiments of the present disclosure.

As shown in FIG. 3D, the lid 11 is attached to the carrier 10 through a second alignment AN2 to surround the optical component 13 to form an optical package device, e.g., the optical package device 100A. The lid 11 may have a portion 11a and a portion 11b connected to the portion 11a. The attachment of the lid may include attaching the portion 11a of the lid 11 to the upper surface b101 of the carrier 10. The portion 11b may have an opening 11h. The second alignment AN2 allows the opening 11h to be substantially aligned with the optical phase array 16. The second alignment AN2 may have a passive alignment and an active alignment. The optical phase array 16 may be configured to output a beam to alignment equipment. Based on the beam from the optical phase array 16, the attachment of the lid 11 can be more accurate.

Figure 3E:
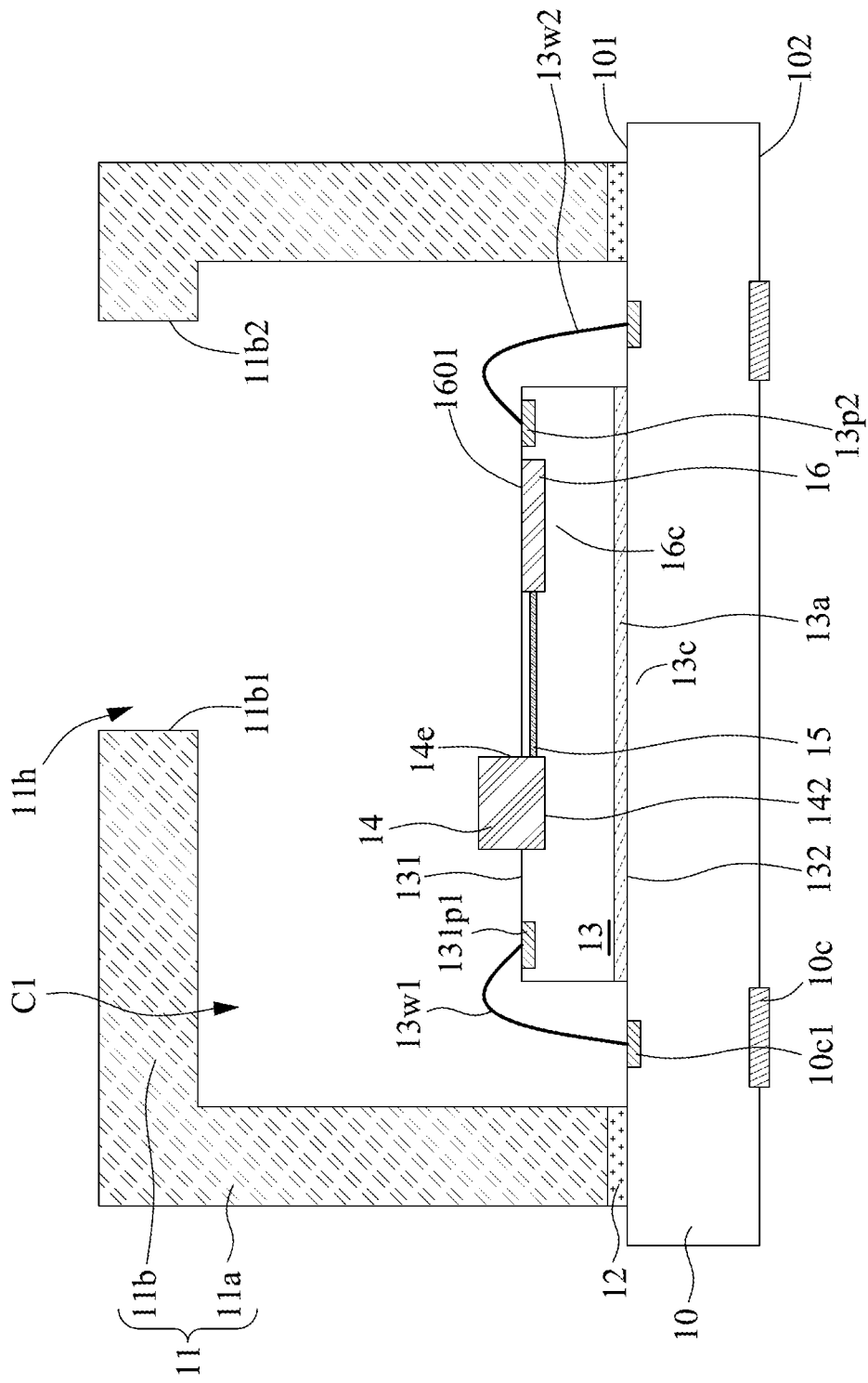
FIG. 3E shows one or more stages of an exemplary method for manufacturing an optical package device according to some embodiments of the present disclosure.

As shown in FIG. 3E, a cavity C1 may be defined by the lid 11 and the carrier 10. The cavity C1 may accommodate the optical component 13.

Figure 3F:
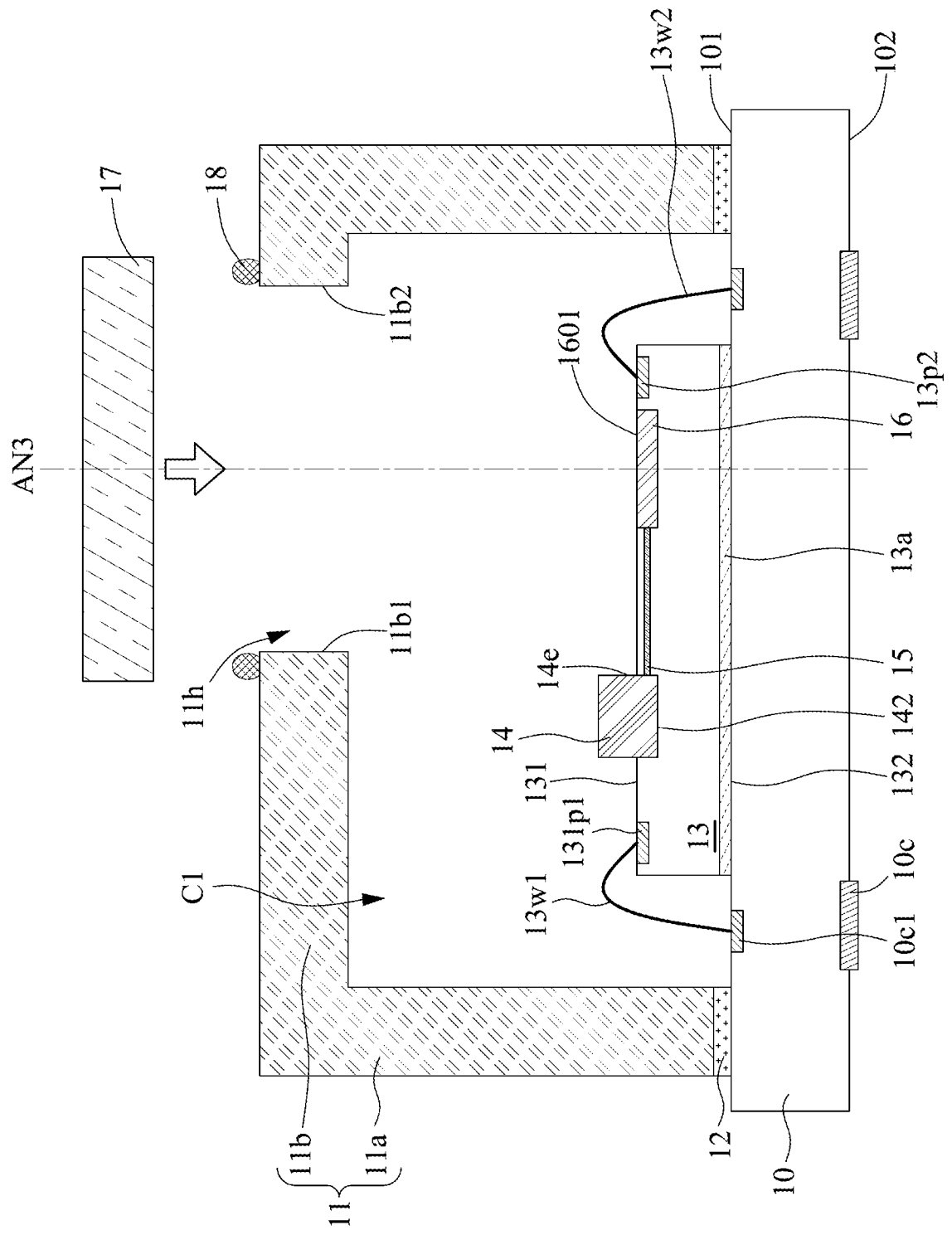
FIG. 3F shows one or more stages of an exemplary method for manufacturing an optical package device according to some embodiments of the present disclosure.

As shown in FIG. 3F, an optical guiding component 17 is attached to the lid 11 through a third alignment AN3 to form an optical package device, e.g., the optical package device 200. The optical guiding component may be attached to the lid 11 via a connection element 18. The third alignment AN3 allows the opening 11h to be substantially aligned with the optical guiding component 17. The third alignment AN3 may have a passive alignment and an active alignment. The optical phase array 16 may be configured to output a beam to the optical guiding component 17, which in turn outputs the other beam to alignment equipment. Based on the beam from the optical guiding component 17, the attachment of the optical guiding component 17 can be more accurate.

Figure 4:
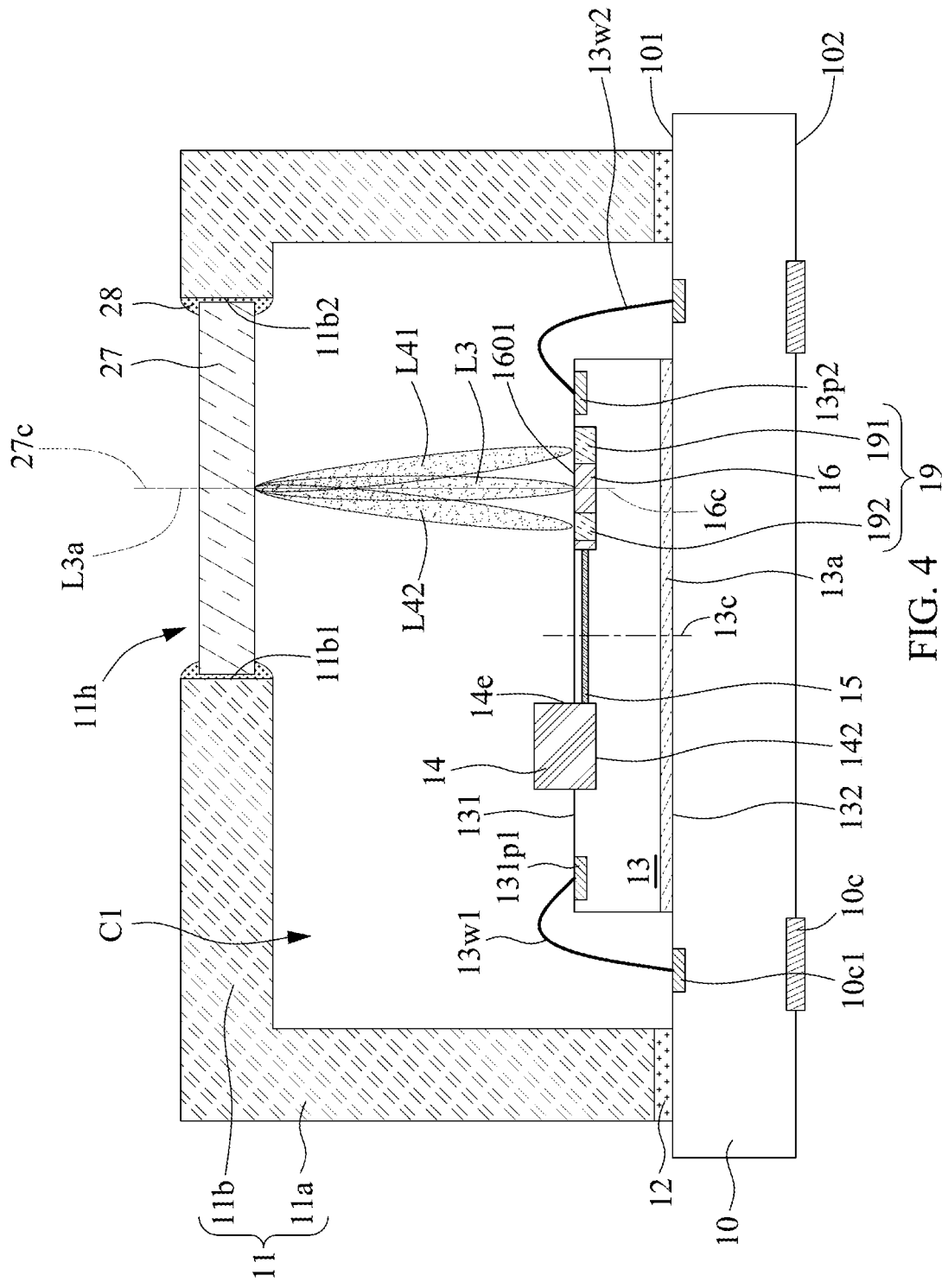
FIG. 4 is a cross-sectional view of an optical package device in accordance with some embodiments of the present disclosure.
Figure 4A:
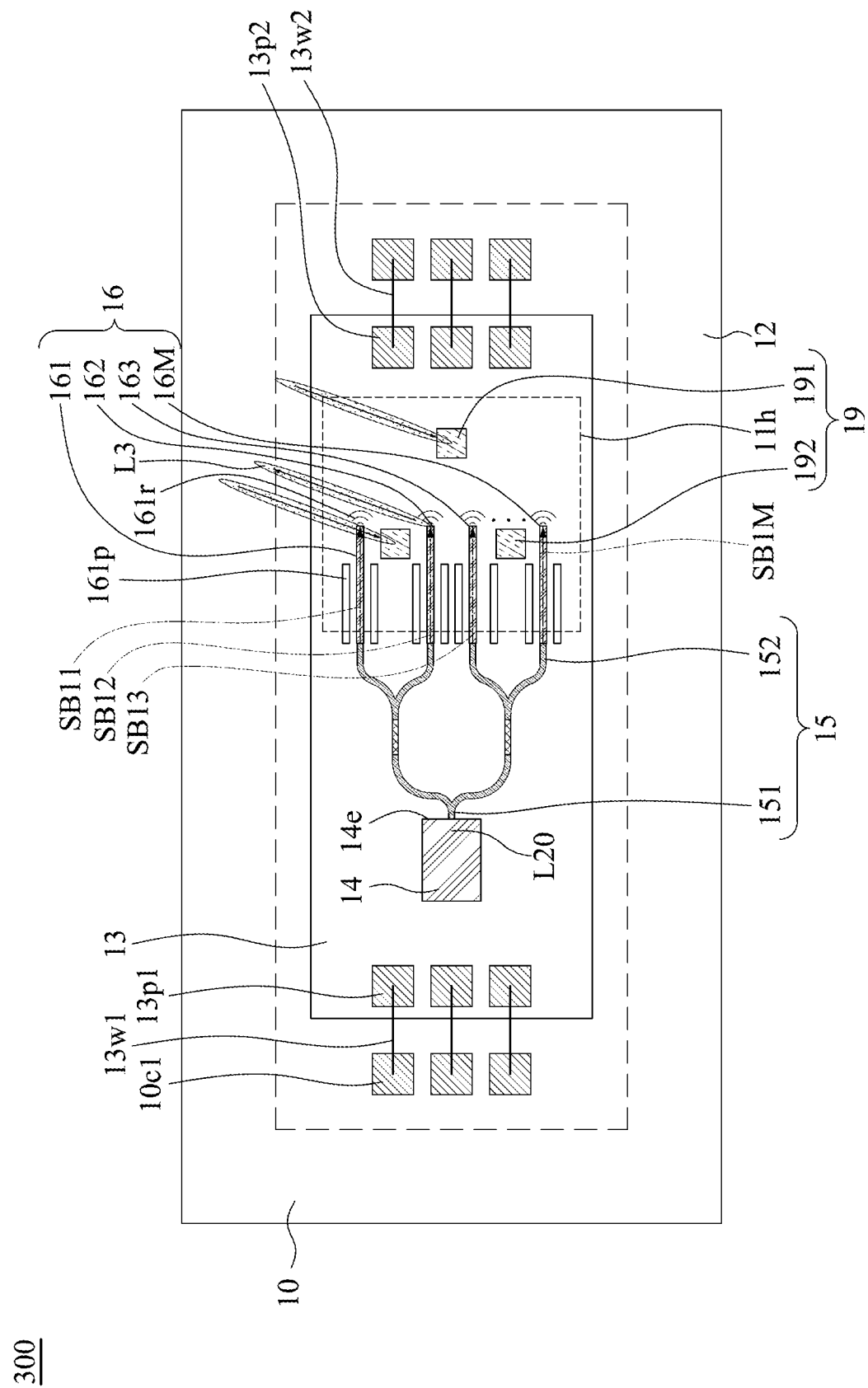
FIG. 4A is a perspective view of an optical package device in accordance with some embodiments of the present disclosure.

FIG. 4 is a cross-sectional view of an optical package device (e.g., an optical package device 300) in accordance with some embodiments of the present disclosure. FIG. 4A is a perspective view of an optical package device (e.g., an optical package device 300) in accordance with some embodiments of the present disclosure. The optical package device 300 of FIGS. 4 and 4A is similar to the optical package device 100A of the FIGS. 1 and 1A. Some detailed descriptions may correspond to preceding paragraphs related to FIGS. 1 and 1A and are not repeated hereinafter for conciseness, with differences therebetween as follows.

The optical package device 300 may further include an optical guiding component 27 disposed within the opening 11h of the lid 11. The optical guiding component 27 may be attached to the sides 11b1 and 11b2 of the portion 11b of the lid 11 via a connection element 28. A physical axis 27c of the optical guiding component 27 perpendicular thereto may be aligned with the physical axis 16c of the optical phase array 16. The physical axis 27c of the optical guiding component 27 perpendicular thereto may be misaligned with the physical axis 13c of the optical component 13.

The optical component 13 may further include a sensing region 19 adjacent to the optical phase array 16. The sensing region 19 may include a plurality of detectors 191 and 192 adjacent to the surface 1601 of the optical phase array 16. Each of the detectors 192 may be disposed between two unit cells (e.g., the unit cells 161 and 162) of the optical phase array 16. The detector 191 may be disposed between the radiators 161r and the pad 13p2.

In some embodiments, the optical guiding component 27 may vertically overlap the grating portion 161r of the optical phase array 16. In some embodiments, the optical guiding component 27 may vertically overlap the sensing portion 19 of the optical phase array 16.

The optical phase array 16 may be configured to output a beam L3. An optical axis L3a of the beam L3 may be aligned with the physical axis 27c of the optical guiding component 27. The beam L3 may propagate from the optical phase array 16 to the optical guiding component 27. The beam L3 may have a cone angle less than 1 degree. The optical phase array 16 may be configured to steer the beam L3 by controlling the phase of the sub-beams SB11, SB12, SB13, . . . , SB1M of the input optical signal L20. The optical phase array 16 may be configured to output the beam L3 in a scanning manner (similar to the beam L1 of FIG. 1). The optical guiding component 17 may be configured to reflect the beam L3 to be beams L41 and L42. The reflected beams L41 and L42 from the optical guiding component 27 may be detected by the sensing region 19 of the optical component 13. The optical guiding component 27 may be configured to detect an external signal, e.g., an audio signal. The optical guiding component 27 may include a membrane.

The reflected beams L41 and L42 may carry the information associated with the external signal. Based on the beam L3 and the reflected beams L41 and L42, the optical component 13 may be configured to determine the external signal. In some embodiments, the optical component 13 may include an electronic component or an integrated circuit configured to determine the external signal.

Figure 5:
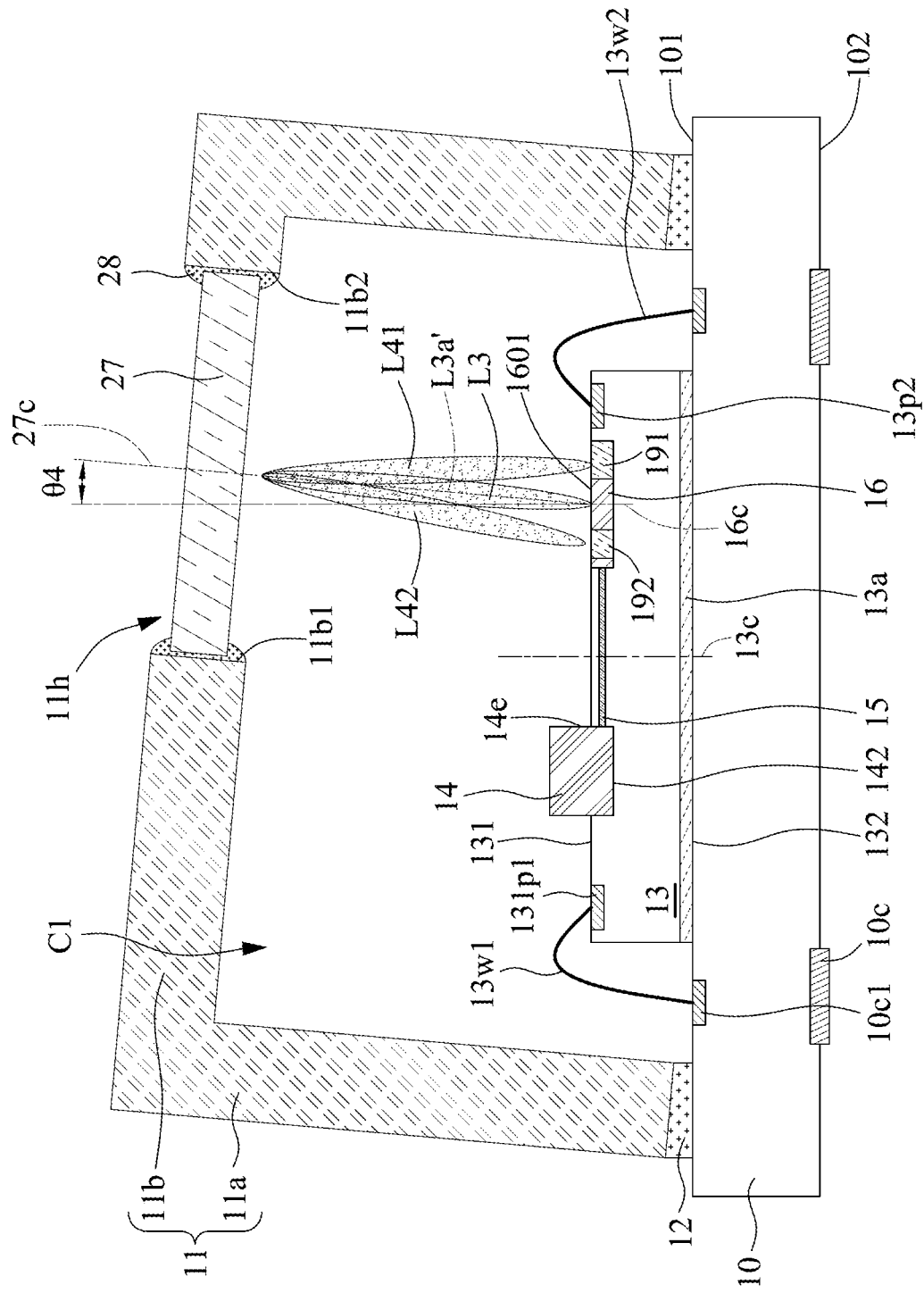
FIG. 5 is a cross-sectional view of an optical package device in accordance with some embodiments of the present disclosure.

FIG. 5 is a cross-sectional view of an optical package device (e.g., an optical package device 300A) in accordance with some embodiments of the present disclosure. Some detailed descriptions may correspond to preceding paragraphs related to FIGS. 4 and 4A and are not repeated hereinafter for conciseness, with differences therebetween as follows.

The lid 11 may be angled in relation to the carrier 10. The portion 11a of lid 11 may be angled in relation to the upper surface 101 of the carrier 10. During the attachment process of the lid 11 to the carrier 10, the lid 11 may be tilted and placed on the upper surface 101 of the carrier 10. As such, the physical axis 16c of the optical phase array 16 perpendicular thereto and the physical axis 27c of the optical guiding component 27 may form an angle θ4. The angle θ4 may be around 0.5, 1, 2, 3 degrees or more. Therefore, the optical phase array 16 may not directly align with the optical guiding component 27. In other words, the physical axis 16c of the optical phase array 16 is misaligned with the physical axis 27c of the optical guiding component 27.

Advantageously, the optical package device 300A is able to actively adjust the direction of the beam L3. By altering (or adjusting, controlling) the phase of the sub-beams SB11, SB12, SB13, . . . , SB1M of the input output signal L20, the multiple slit diffraction occurs between the wavefronts of the sub-beams SB11, SB12, SB13, . . . , SB1M may output the beam L3 with a tilted optical axis L3a', with respect to the optical phase array 16. The optical axis L3a' of the beam L3 and the physical axis 16c of the optical phase array 16 may form an angle θ4. The optical axis L3a' of the beam L3 may be substantially parallel to the physical axis 27c of the optical guiding component 27. As such, the beam L3 can propagate toward the optical guiding component 27 and be incident on the optical guiding component 27 at a desired angle (e.g., normal angle). That is, an offset (including shift or tilt) between the optical guiding component 27 and the optical phase array 16 that occurs during the attachment process can be compensated by actively steering the beam L3 to a desired direction.

FIGS. 6A, 6B, 6C, 6D, 6E, and 6F show one or more stages of an exemplary method for manufacturing an optical package device (e.g., the optical package device 300 or 300A) according to some embodiments of the present disclosure.

The stages as illustrated in FIGS. 6A-6E are similar to those in FIGS. 3A-3E, respectively, except that the optical component 13 may further include a plurality of detectors 191 and 192.

Figure 6A:
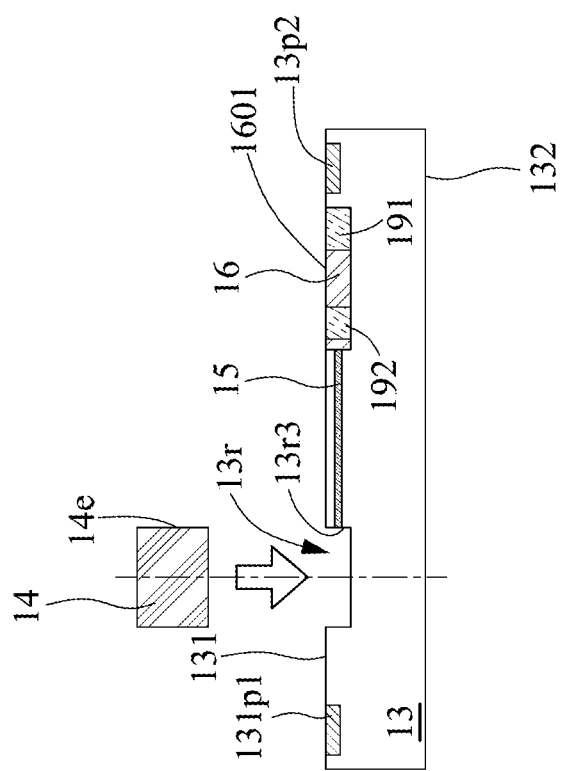
FIG. 6A shows one or more stages of an exemplary method for manufacturing an optical package device according to some embodiments of the present disclosure.
Figure 6B:
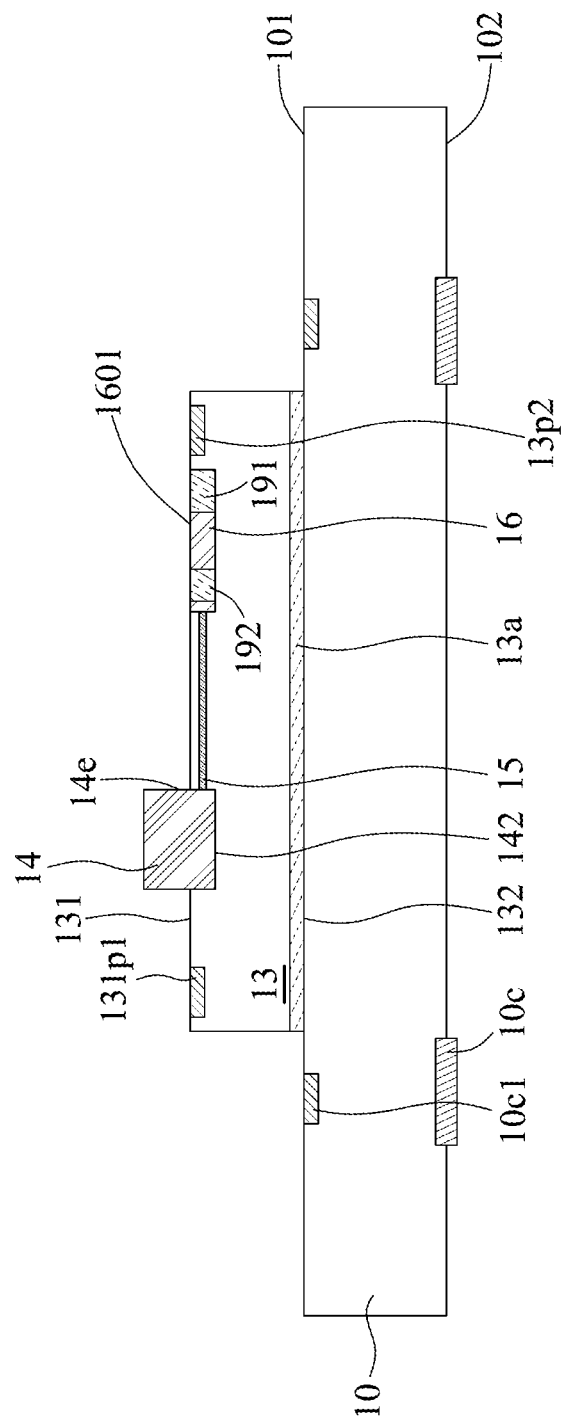
FIG. 6B shows one or more stages of an exemplary method for manufacturing an optical package device according to some embodiments of the present disclosure.
Figure 6C:
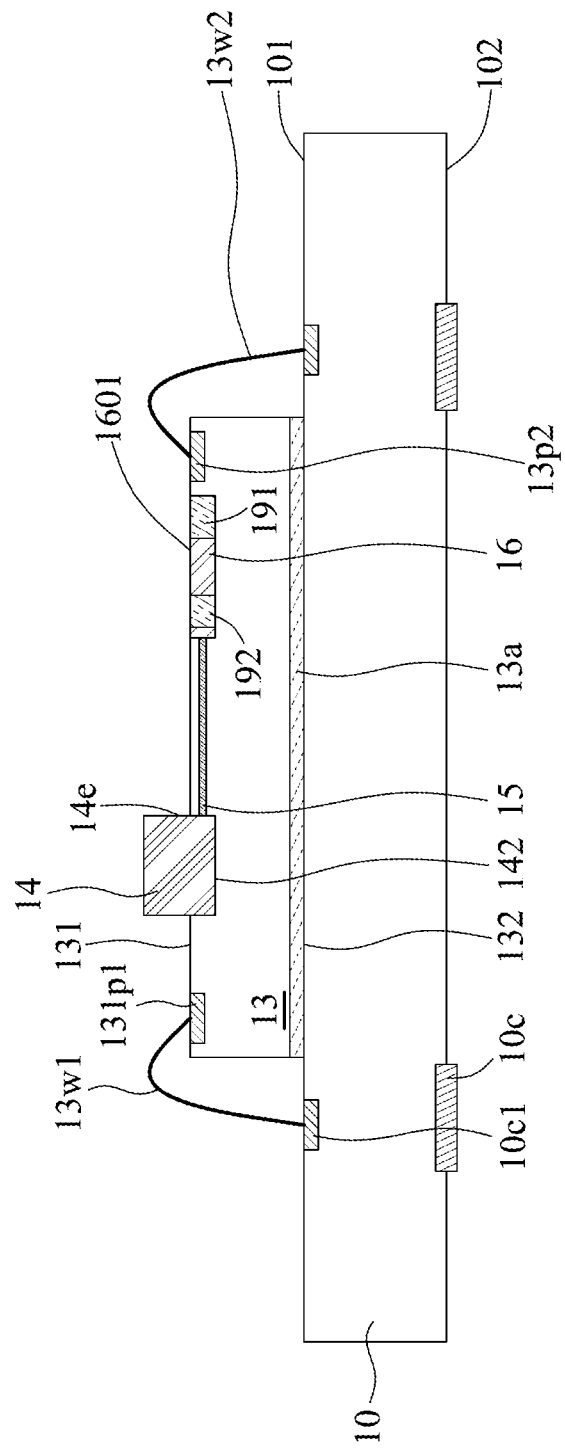
FIG. 6C shows one or more stages of an exemplary method for manufacturing an optical package device according to some embodiments of the present disclosure.
Figure 6D:
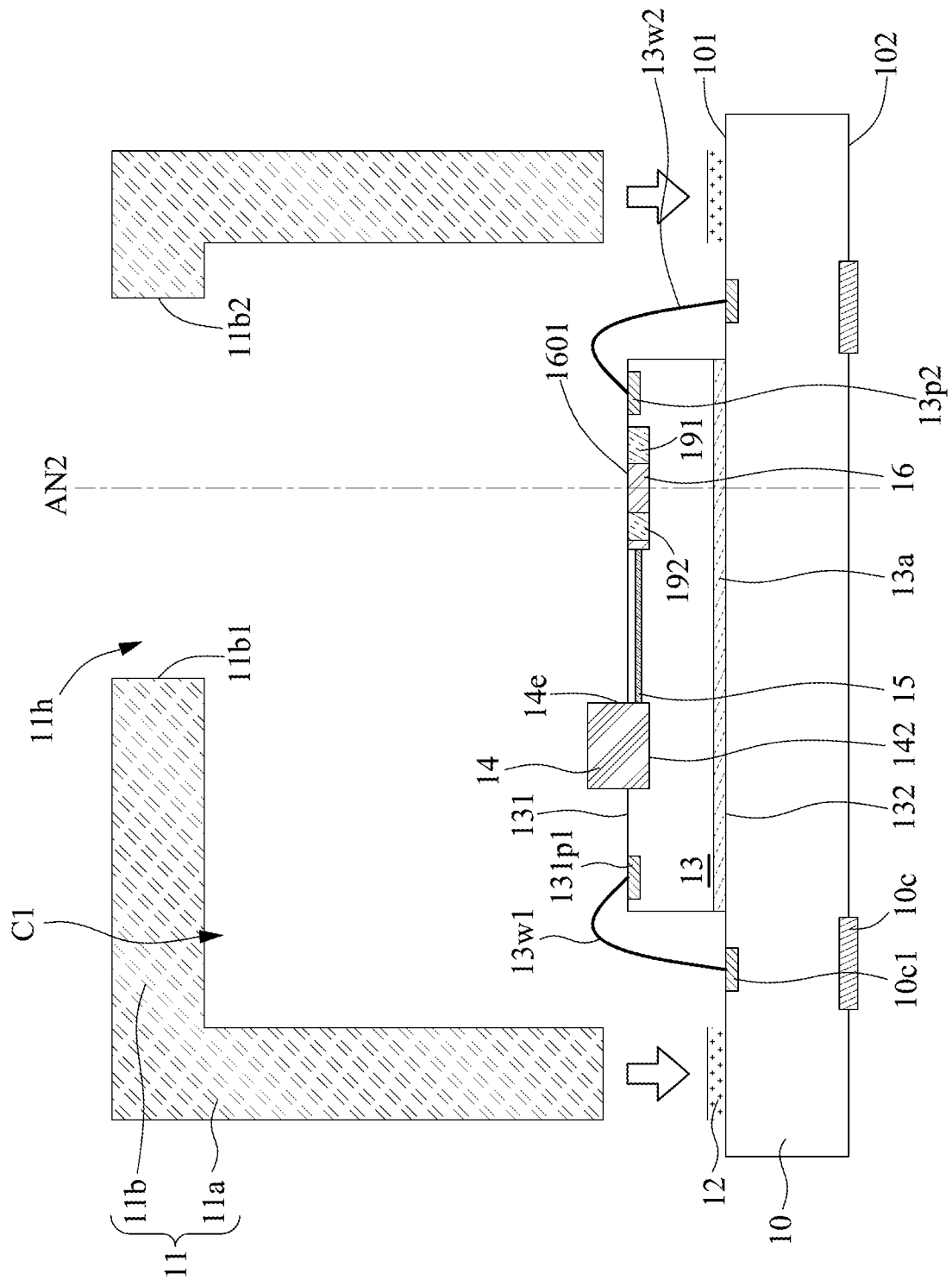
FIG. 6D shows one or more stages of an exemplary method for manufacturing an optical package device according to some embodiments of the present disclosure.
Figure 6E:
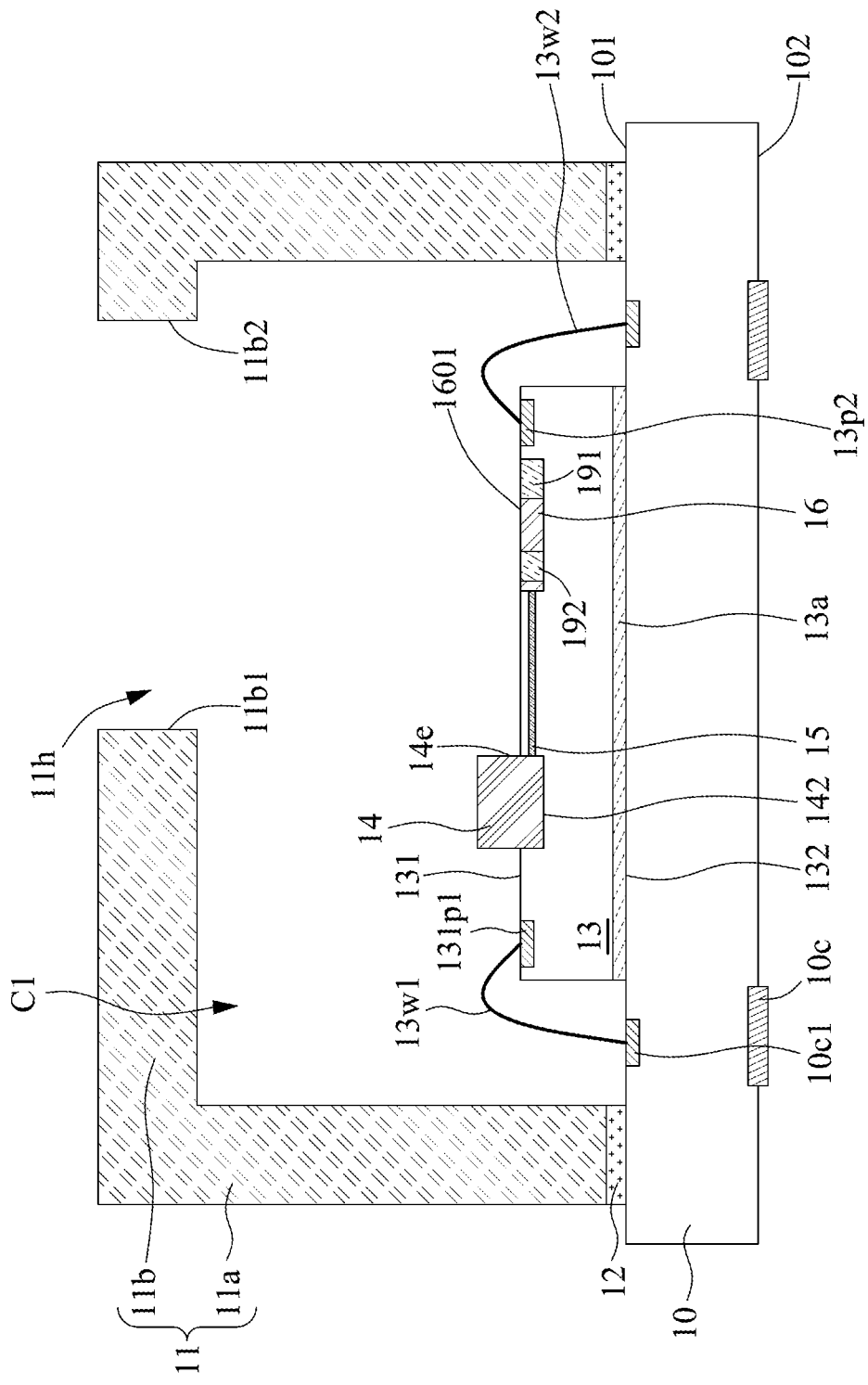
FIG. 6E shows one or more stages of an exemplary method for manufacturing an optical package device according to some embodiments of the present disclosure.
Figure 6F:
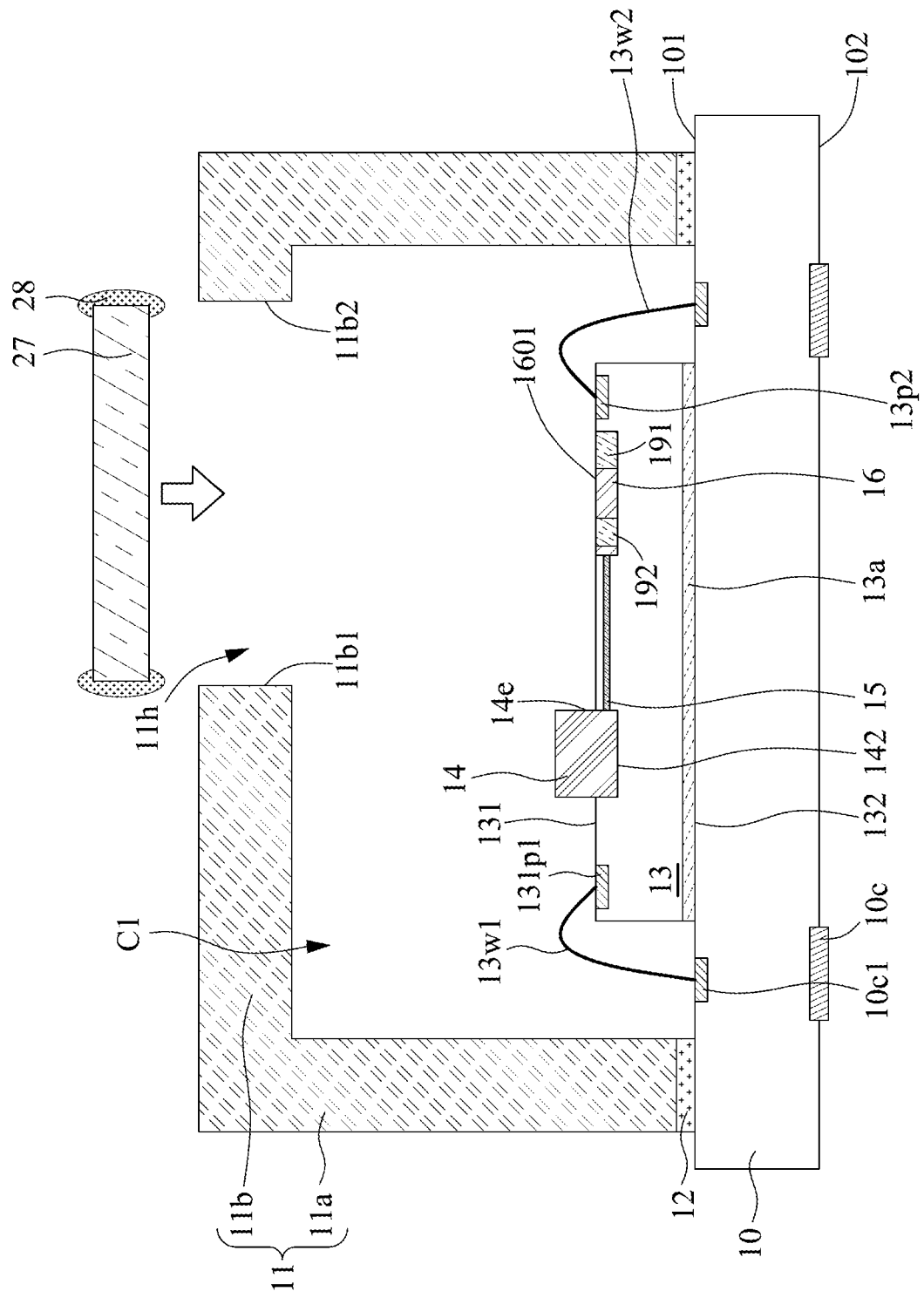
FIG. 6F shows one or more stages of an exemplary method for manufacturing an optical package device according to some embodiments of the present disclosure.

As shown in FIG. 6F, an optical guiding component 27 is attached to the lid 11 to form an optical package device, e.g., the optical package device 300. The optical guiding component 27 may be disposed within the opening 11h via a connection element 28. The optical guiding component 27 may be substantially aligned with the optical phase array 16.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical package device, comprising:
an optical component, configured to change a phase of an input optical signal from a first state to a second state, and to output a first beam with a phase of the second state;
an optical guiding component disposed adjacent to the optical component, the first beam propagating from the optical component toward the optical guiding component; and
a lid in contact with the optical guiding component,
wherein a physical axis of the optical component perpendicular thereto is not parallel with a physical axis of the optical guiding component perpendicular thereto.

2. The optical package device of claim 1, wherein an optical axis of the first beam is parallel with the physical axis of the optical guiding component.

3. The optical package device of claim 1, wherein the optical component further comprises a waveguide configured to transmit the input optical signal; and a phase change element, and the waveguide has a first portion optically coupled to an optical source and a second portion optically coupled to the phase change element.

4. The optical package device of claim 1, wherein the optical component outputs the first beam in a scanning manner and configured to form a pattern analogous to flood light or a dot array.

5. The optical package device of claim 3, wherein the phase change element comprises a plurality of unit cells, each of the unit cells allows a sub-beam to propagate therethrough.

6. The optical package device of claim 5, wherein each of the unit cells of the phase change element comprises a phase shifter configured to alter a phase of the corresponding sub-beam.

7. The optical package device of claim 6, wherein the phase shifter is configured to change refractive indexes of the unit cells.

8. The optical package device of claim 1, further comprising a carrier, wherein the lid is disposed over the carrier, and wherein the carrier and the lid collectively define a cavity for accommodating the optical component.

9. The optical package device of claim 8, wherein the optical guiding component comprises a membrane.

10. The optical package device of claim 1, wherein the optical component comprises a detector configured to detect a second beam reflected from the optical guiding component.

11. An optical package device, comprising:
a carrier;
a lid disposed over the carrier and having an opening, wherein the carrier and the lid collectively define a cavity;
a photonic component disposed in the cavity and configured to change a phase of an input optical signal from a first state to a second state, and to output a first beam with a phase of the second state,
wherein the first beam propagates through the opening of lid, and
wherein a physical axis of the photonic component perpendicular thereto is misaligned with a physical axis of the opening.

12. The optical package device of claim 11, wherein the photonic component comprises an optical phase array is configured to project a pattern on an external object via the first beam in a scanning manner.

13. The optical package device of claim 11, wherein an optical phase array is disposed within the photonic component.

14. The optical package device of claim 13, wherein the photonic component comprises a waveguide optically coupled to the optical phase array.

15. The optical package device of claim 14, wherein the photonic component further comprising a sensing region adjacent to the optical phase array.

16. The optical package device of claim 14, further comprising an optical source disposed over or partially embedded in the photonic component.

17. The optical package device of claim 16, wherein the optical source is optically coupled to the optical phase array via the waveguide.

18. The optical package device of claim 11, wherein the first beam is deflected from a propagation direction of the input optical signal.

19. A method of manufacturing an optical package device, comprising:
disposing an optical source over an optical component through a first alignment;
attaching the optical component to a carrier; and
attaching a lid to the carrier through a second alignment to surround the optical component,
wherein the optical component is disposed in a chamber collectively defined by the lid and the carrier.

20. The method of claim 19, further comprising attaching an optical guiding component to the lid through a third alignment.

* * * * *